(12) United States Patent
Durch et al.

(10) Patent No.: US 12,686,729 B2
(45) Date of Patent: Jul. 21, 2026

(54) CLEAN LABEL STARCH COMPOSITIONS

(71) Applicant: CARGILL, INCORPORATED, Wayzata, MN (US)

(72) Inventors: Nicole Marie Durch, Waconia, MN (US); Varatharajan Vamadevan, Plymouth, MN (US)

(73) Assignee: Cargill, Incorporated, Wayzata, MN (US)

( * ) Notice: Subject to any disclaimer, the term of this patent is extended or adjusted under 35 U.S.C. 154(b) by 811 days.

(21) Appl. No.: 17/778,937

(22) PCT Filed: Nov. 11, 2020

(86) PCT No.: PCT/US2020/062351
§ 371 (c)(1),
(2) Date: May 23, 2022

(87) PCT Pub. No.: WO2021/108655
PCT Pub. Date: Jun. 3, 2021

(65) Prior Publication Data
US 2023/0002512 A1 Jan. 5, 2023

Related U.S. Application Data

(60) Provisional application No. 62/941,291, filed on Nov. 27, 2019.

(51) Int. Cl.
*C08B 30/12* (2006.01)
*A23L 5/20* (2016.01)
(Continued)

(52) U.S. Cl.
CPC ................ *C08B 30/12* (2013.01); *A23L 5/21* (2016.08); *A23L 23/00* (2016.08); *A23L 29/212* (2016.08); *C08L 3/02* (2013.01)

(58) Field of Classification Search
None
See application file for complete search history.

(56) References Cited

U.S. PATENT DOCUMENTS 5,851,959 A * 12/1998 Bernu .................... C09K 8/206
507/212
6,221,420 B1 4/2001 Thomas
(Continued)

FOREIGN PATENT DOCUMENTS

CA 2270024 C 7/2007
CN 103997909 A 8/2014
(Continued)

OTHER PUBLICATIONS

"Recommended Starch and modified starch products from each company", Monthly Food Chemical, Nov. 2019, pp. 49-54.
(Continued)

*Primary Examiner* — Stefanie J Cohen

(57) ABSTRACT

A label friendly starch composition, and method of making, includes a thermally inhibited (TI) corn starch and a waxy starch in an amount up to about 50 weight percent of the starch composition. In an example, the waxy starch can be waxy rice and the amount can be between about 15 and about 50 weight percent of the starch composition. In an example, the waxy starch can be waxy corn and the amount can be between about 15 and about 25 weight percent of the starch composition. The starch compositions disclosed herein can be suitable for use in a variety of food products, including, but not limited to, soups and sauces. The food products containing the starch compositions disclosed herein exhibit favorable viscosity, refrigeration stability and resistance to breakdown from a freeze/thaw cycle.

17 Claims, 23 Drawing Sheets

(51) Int. Cl.

| | | |
|---|---|---|
| *A23L 23/00* | (2016.01) | |
| *A23L 29/212* | (2016.01) | |
| *C08L 3/02* | (2006.01) | |

(56) References Cited

U.S. PATENT DOCUMENTS

| | | | | |
|---|---|---|---|---|
| 2003/0039741 A1* | 2/2003 | Carver | .................... | A23L 23/00 |
| | | | | 426/661 |
| 2003/0099692 A1* | 5/2003 | Lydzinski | .............. | A61Q 11/00 |
| | | | | 424/443 |
| 2013/0337118 A1* | 12/2013 | Sistrunk | .................. | A23L 19/18 |
| | | | | 426/94 |

FOREIGN PATENT DOCUMENTS

| | | | |
|---|---|---|---|
| CN | 109996447 | A | 7/2019 |
| EP | 1281721 | B1 | 6/2007 |
| EP | 1038882 | B2 | 10/2008 |
| EP | 2246365 | A1 | 11/2010 |
| EP | 2783583 | B1 | 2/2018 |
| JP | 10-503803 | A | 4/1998 |
| JP | 2006314302 | A | 11/2006 |
| WO | 9623038 | W | 8/1996 |
| WO | 02100178 | W | 12/2002 |
| WO | 2005047385 | A1 | 5/2005 |
| WO | 2018/098180 | A1 | 5/2018 |
| WO | 2019/055381 | A1 | 3/2019 |
| WO | 2019089656 | W | 5/2019 |
| WO | 2019/206722 | A2 | 10/2019 |

OTHER PUBLICATIONS

Momose, Y., "Novation™—Functional Starch for the new era", Monthly food chemical, Feb. 2010, p. 48-53.

* cited by examiner

Soup Sample with TI Corn Starch, after 5 F/T cycles

Soup Sample with Blend of TI Corn (85%) and Waxy Rice (15%), after 5 F/T cycles

Soup Sample with Blend of TI Corn (75%) and Waxy Rice (25%), after 5 F/T cycles

Soup Sample with Blend of TI Corn (50%) and Waxy Rice (50%), after 5 F/T cycles

Soup Sample with Blend of TI Corn (85%) and Waxy Corn (15%), after 5 F/T cycles

Soup Sample with Blend of TI Corn (75%) and Waxy Corn (25%), after 5 F/T cycles

Soup Sample with Blend of TI Corn (50%) and Waxy Corn (50%), after 5 F/T cycles

Soup Sample with Blend of TI Corn (85%) and Tapioca (15%), after 5 F/T cycles

Soup Sample with Blend of TI Corn (75%) and Tapioca (25%), after 5 F/T cycles

Soup Sample with Blend of TI Corn (50%) and Tapioca (50%), after 5 F/T cycles

1

CLEAN LABEL STARCH COMPOSITIONS

CROSS REFERENCE TO RELATED
APPLICATIONS

This application is a national phase application of PCT/US2020/062351, filed 11 Nov. 2020, entitled CLEAN LABEL STARCH COMPOSITIONS, which claims the benefit of U.S. Provisional Patent Application No. 62/941,291, filed 27 Nov. 2019, entitled CLEAN LABEL STARCH COMPOSITIONS which are hereby incorporated by reference in their entirety.

TECHNICAL FIELD

The present patent application relates to the field of starch compositions for use in food products and, more particularly, relates to a label friendly starch composition of thermally inhibited corn starch and a waxy starch.

BACKGROUND

Starch is a common food ingredient given its properties to facilitate thickening, gelling, and moisture-retention, and its suitability as a texturant. An instant starch is one that swells and develops increased viscosity in solution without heating. Instant starches are used, for example, in instant puddings. Starch is a carbohydrate polymer and can consist essentially of amylose and/or amylopectin. The major component (about 70-80%) of most starches is amylopectin, which is a branched polymer of several thousand to several hundred thousand glucose units. Amylose is the minor component (about 20-30%) of most starches. However, there are high amylose starches with 50-70% amylose. Amylose is essentially a linear glucose polymer of several hundred to several thousand glucose units. A waxy corn starch can contain almost 100% (or 95% or greater) amylopectin. Low amylose corn starch can contain less than 10% amylose.

Sources of starch include but are not limited to cereals, tubers, roots, rhizomes or fruits. Common sources of starch include but are not limited to corn, rice, wheat, barley, sorghum, buckwheat, millet, quinoa, potato, tapioca/cassava, arrowroot, sweet potatoes, taro, yams, banana, kudzu, oca, and sago. Edible beans, such as favas, lentils and pea, chick pea, are also rich in starch.

Some starches are classified as waxy starches. A waxy starch consists essentially of amylopectin, i.e. it contains at least about 95 wt % amylopectin. Common waxy starches include waxy corn starch, waxy rice, waxy potato, waxy wheat, waxy tapioca and waxy cassava starch.

A native starch is one that has been isolated from its plant source without altering its chemical structure. A modified starch has a structure that has been altered from its native state, resulting in modification of one or more of its chemical or physical properties. Starches are typically functionalized by chemical or enzymatic means. Chemical means can include crosslinking or substitution with various chemical compounds. For example, starches can be modified to increase stability, improve texture, increase or decrease viscosity, and/or increase or decrease solubility, among others. In one example, modified starches are cross-linked for example to improve stability. Starches that are modified by substitution or crosslinking have a different chemical composition.

A starch can undergo thermal processing, such as heat moisture treatment (HMT), i.e. heating in the presence of water, or thermal inhibition, i.e. heating essentially in the absence of water. A thermally inhibited (TI) starch is not regarded as a chemically modified starch. As such, a TI starch can be regarded as a clean label starch.

There is an increased demand from food consumers for clean label starches, such as native or physically modified, to replace chemically-modified food starches commonly used in various food products.

Overview

The present inventors recognize, among other things, an opportunity for a label-friendly starch composition comprising a thermally inhibited (TI) corn starch and a waxy starch. Examples of waxy starches include waxy corn starch, waxy rice, waxy potato, waxy wheat, waxy tapioca and waxy cassava starch and combinations thereof. Preferably the waxy starch is waxy corn or waxy rice. The starch composition is suitable for use in food products and can provide improved performance in a thermally sterilized food product as compared to using TI corn starch alone. Thermal sterilization of the food product can include one or more of retort, ultrahigh temperature (UHT) treatment, and aseptic packaging.

The present invention includes also a starch composition comprising a thermally inhibited (TI) corn starch, and a waxy starch in an amount up to and including about 50 weight percent of the starch composition, wherein the waxy starch is preferably waxy corn or waxy rice. In an example, the waxy starch is waxy rice and its amount ranges between about 15 and about 50 weight percent of the starch composition. In another example, the waxy starch is waxy corn and the amount ranges between about 15 and about 25 weight percent of the starch composition. A food product can contain the starch composition of the invention and one or more additional food ingredients. In an example, the food product can be a soup. Preferably, the food product is subjected to a retort process, preferably said retort process being carried out once the food product is inside its packaging. The retorted food product can be stored at room temperature and consumed at a future date. In an example, the retorted food product can have a long shelf life. In an example, the retorted food product may be optionally heated before consumption. In an example, the food product may undergo ultrahigh temperature (UHT) treatment. In an example, an aseptic packaging process can be used for the food product. Processes for thermally retorting a food product are known in the art, e.g. from EP2783583. By "retort process" is intended to mean a process in which the food product is exposed to heat in a sealed container to render it commercially sterile. Retorting includes such process in any sealed container, including without limitation a can, pouch or jar of any material including without limitation glass and metals.

The invention also relates to a starch composition comprising a thermally inhibited (TI) corn starch in a first amount ranging between about 50 and about 85 weight percent of the starch composition, and a waxy starch in a second amount ranging between about 15 and about 50 weight percent of the starch composition. Preferably, the waxy starch is waxy corn or waxy rice. Preferably, the first amount is between about 75 and 85 weight percent of the starch composition. In an example, the waxy starch is waxy rice and the second amount is between about 15 and about 25 weight percent of the starch composition. In another example, the waxy starch is waxy corn and the second amount is between about 15 and about 25 weight percent of the starch composition. The invention also relates to a food product containing the starch composition described above, wherein the starch composition is preferably equal to or less than about 5 weight percent of the food product. In an example, the food product can be configured for storage at room temperature, prior to consumption of the food product.

Examples according to the present application can include a method of making a label friendly starch composition and the method can comprise producing or providing a thermally inhibited (TI) corn starch, producing or providing a waxy starch, and blending the TI corn starch and the waxy starch to form a starch composition. The waxy starch can range up to and including 50 weight percent of the starch composition, preferably between about 15 and about 50 weight percent of the starch composition. Preferably, the waxy starch is waxy corn or waxy rice. Preferably, the waxy starch ranges between about 15 and about 25 weight percent of the starch composition. Preferably, the TI corn starch ranges between about 50 and about 85 weight percent of the starch composition.

Examples according to the present application can include a method of making a food product containing a label friendly starch composition and the method can comprise producing or providing a starch composition comprising a thermally inhibited (TI) corn starch and a waxy starch in an amount up to about 50 weight percent of the starch composition, combining the starch composition with one or more additional food ingredients to form the food product, thermally processing or sterilizing the food product to form an aseptic, sterilized or retorted food product that can be stored at room temperature prior to consumption by a consumer. In an example, the food product is a soup. In an example in which the food product is a soup, the soup can go through the retort process once the soup is packaged inside the can. The waxy starch in the soup formulation can be waxy corn or waxy rice. In an example, the waxy starch is waxy corn and the amount ranges between about 15 and about 25 weight percent of the starch composition. In an example, the waxy starch is waxy corn and the amount ranges between about 15 and about 25 weight percent of the starch composition.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
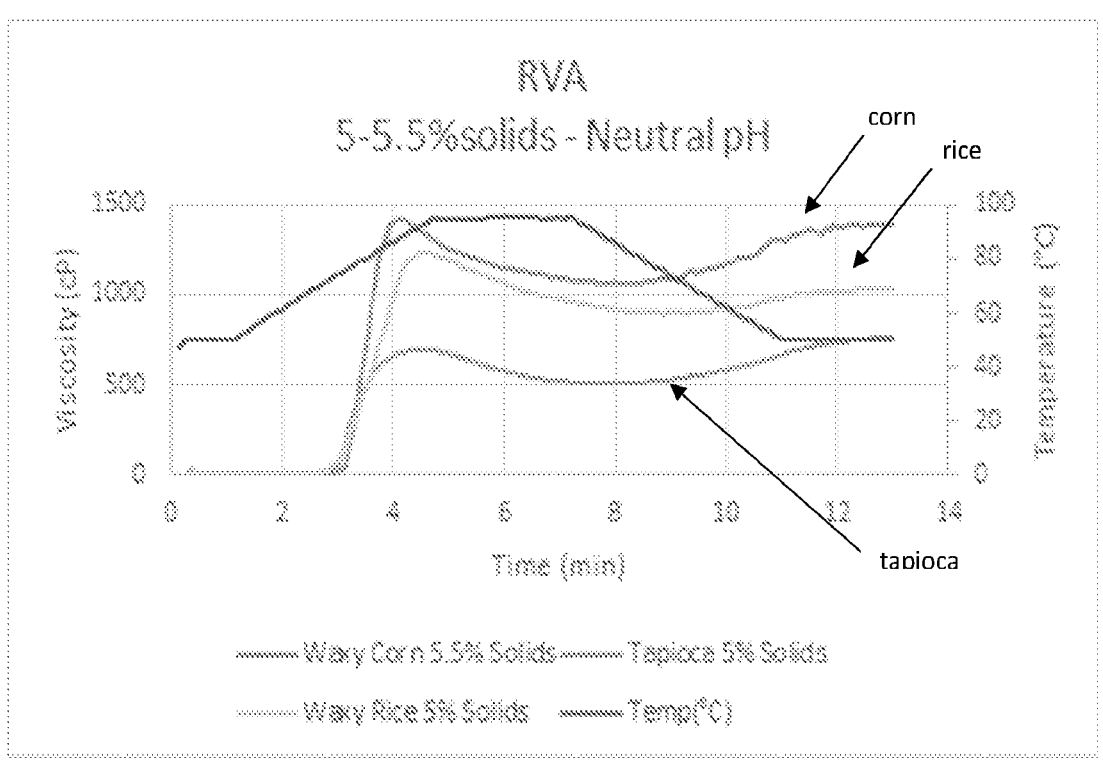
FIG. 1 is a plot of the viscosity profile, as a function of time and temperature, for waxy corn, waxy rice and tapioca.

The present application provides a starch composition comprising a thermally inhibited (TI) corn starch and a waxy starch. Examples of waxy starches include waxy corn starch, waxy rice, waxy potato, waxy wheat, waxy tapioca and waxy cassava starch and combinations thereof. The starch compositions of the present application can include a thermally inhibited (TI) corn starch in combination with a native waxy starch. Preferably, the TI corn starch is a TI waxy corn starch, i.e. a waxy corn or low amylose (less than 10%) corn starch that has been physically functionalized by way of heat processing. Preferably, the waxy starch is waxy corn or waxy rice. A TI starch and/or a chemically modified starch can commonly be used in foods that undergo retort processes because such modified starches can swell and stay intact, allowing for increased viscosity for the finished product. However, the present inventors unexpectedly found that a starch composition of TI corn starch and waxy corn or waxy rice can have improved performance in a retorted food product, compared to if TI corn starch is used individually in the retorted food product. Waxy corn and waxy rice are native starches and thus it was surprising that replacing a portion of the TI corn starch with such native starches resulted in improved performance. This finding contradicts the typical understanding in the art believing that native starches on their own would breakdown when exposed to high heat, such as in a retort process and thus would not contribute to improved performance. Such improved performance, as described below, included for example increased freeze/thaw stability of the food product that the starch composition was used in.

The starch compositions of TI corn starch and a waxy starch, preferably a waxy corn or waxy rice can be suitable for use in a food product, particularly a retorted food product, such as a soup or a pasta sauce. A retorted food product containing a composition of TI corn starch and waxy corn or waxy rice showed greater stability and better performance compared to a similar product containing TI corn starch alone. As demonstrated herein, the starch compositions containing waxy corn or waxy rice are well suited for use in a soup that may undergo a freeze/thaw cycle prior to being consumed by a user.

The starch compositions disclosed herein can be suitable in many different food products, examples of which are provided below. Because a thermally inhibited corn starch has been physically functionalized, rather than chemically modified, the starch compositions disclosed herein can provide a label friendly starch solution for the food product that such compositions are used in. Thermal inhibition is a physical modification process viewed more favorably amongst consumers as an alternative to chemical modification. It shall be understood that various technologies can be used to achieve thermal inhibition, for example but not limited to fluidized bed reactor, paddle mixer reactor, microwave, and radiofrequency technologies. The process for thermally inhibiting a starch is known in the art for example from EP1281721, EP2246365 and EP1038882.

In an example, the starch compositions disclosed herein can be used in food products, preferably those that are thermally sterilized to extend a shelf life of the product. Moreover, such retorted (or otherwise thermally sterilized) food products can be stored at room temperature. Such food products can include, for example, soups, and various types of sauces, gravies and beverages. Sauces can include, but are not limited to, tomato-based sauces, cheese sauces, Asian-style sauces, and gravies. For purposes herein, "label friendly" generally means that the starch, or the food product the starch is contained within, is not chemically modified. For purposes herein, "sauce" generally refers to a thick liquid served with food to add moistness and flavor. Typically, a sauce includes texturizers such as flour or starch.

The invention relates to a starch composition comprising a TI corn starch and a waxy starch, the waxy starch being in an amount of at least 50 wt % relative to the starch composition. Preferably the waxy starch is a waxy corn starch or a waxy rice starch. Preferably, the waxy starches, e.g. waxy corn and waxy rice, are native waxy starches. The TI corn starch is preferably a TI waxy corn starch. The invention also relates to a starch composition comprising a TI waxy corn starch and a native waxy starch, the native waxy starch being in an amount of at least 50 wt % relative to the starch composition. Preferably, the amount of the waxy starch is at least 3 wt %, more preferably at least 5 wt %, even more preferably at least 7 wt %, most preferably at least 10 wt %. When the waxy starch is waxy corn, the amount of waxy starch is between 10 and 50 wt %, more preferably between 15 and 50 wt %. When the waxy starch is waxy rice, the amount of waxy starch is between 10 and 50 wt %, more preferably between 15 and 50 wt %.

The invention also relates to a starch composition comprising a TI corn starch in a first weight amount relative to the total weight amount of the composition and a waxy starch in a second weight amount relative to the total weight amount of the composition, the first weight amount being equal with or higher than the second weight amount. Preferably, the first weight amount is higher than the second weight amount. Preferably. the first weight amount is at least 50%, more preferably at least 55 wt %, even more preferably at least 60 wt %, even more preferably at least 65 wt %, most preferably at least 70 wt %. Preferably the second weight amount is at most 50 wt %, more preferably at most 45 wt %, more preferably at most 40 wt %, even more preferably at most 35 wt %, most preferably at most 30 wt %. Preferably the first weight amount is at least 55 wt % and the second weight amount is at most 45 wt %, more preferably at most 40 wt %, even more preferably at most 35 wt %, most preferably at most 30 wt %. Preferably the first weight amount is at least 60 wt % and the second weight amount is at most 40 wt %, more preferably at most 35 wt %, most preferably at most 30 wt %.

The starch compositions of the present application can include TI corn starch and waxy starch, and the waxy starch can be in an amount up to about 50 weight percent of the starch compositions. In an example, the waxy starch can be waxy rice and the amount of the waxy rice is preferably between about 15 and about 50 weight percent of the starch composition, more preferably between about 15 and about 25 weight percent of the starch compositions. In an example, the waxy starch can be waxy corn and the amount is preferably between about 15 and about 25 weight percent of the starch composition. The starch compositions were found to have similar viscosity profiles to TI corn starch, while showing superior performance after multiple freeze thaw cycles, compared to TI corn starch only, when used in a food product. Superior performance as used herein can refer to one or more of viscosity, texture, and storage stability.

A Rapid Visco Analyser (RVA) Perkins Elmer 4800 can be used to measure a viscosity of the starch compositions. The compositions can be heated to 120° C., held for 2.6 minutes (156 seconds), then cooled to 50° C. and held for 2 minutes (122 seconds). The RVA can be operated at 160 revolutions per minute. (Heating to 120° C. is relevant to a typical retort process of a food product containing the starch samples described herein.) As used herein, the final viscosity of the composition or sample refers to the viscosity at the end of the RVA run. As used herein, the hot paste viscosity of the composition or sample refers to the viscosity at the end of the holding time at 120° C. In an example, the starch compositions have a final viscosity of between 500 and 1200 centipoise, between 600 and 1000 centipoise, or between 600 and 900 centipoise. In an example, the starch compositions have a hot paste viscosity at 120° C. of between 300 and 900 centipoise, between 400 and 800 centipoise, or between 500 and 800 centipoise.

In an example in which the starch compositions contain waxy rice, the waxy rice can be waxy white rice flour or low amylose white rice flour. Both waxy white rice flour and low amylose white rice flour can be characterized by a high starch content (80% or more) and can contain protein, e.g. at least 5 wt % protein, preferably at least 10 wt % protein. White rice flour can be used as a substitute for rice starch in canned food or retort applications.

The starch compositions disclosed herein can be used in retort food applications, such as soup. A method of making a food product containing a label friendly starch can include producing or providing a starch compositions comprising a TI corn starch and a waxy starch in an amount up to about 50 weight percent of the starch composition. The method can include combining the starch composition with one or more additional ingredients to form the food product and thermally processing the food product to form a sterilized food product. In an example, the post-retort viscosity of the food product is greater than 200 centipoise, measured at 70° F., or greater than 500 centipoise, greater than 800 centipoise, or greater than 1000 centipoise.

Examples of a chicken soup recipe containing the starch compositions are provided below in the Examples section. Favorable properties were observed, including a general absence of weeping or syneresis and a smooth texture after one or more freeze/thaw cycles. Microscopy results provided below show that the use of starch compositions with waxy corn or waxy rice in the soup resulted in more intact starch granules after multiple freeze/thaw cycles, as compared to if TI corn starch only was used in the soup formulation.

The starch composition of this application may be used in any retorted food product. Food products also include those which may also be classified as pharmaceutical or nutritional products, such as diabetic foods and supplements, dietetic foods, foods to control glycemic response, foods for dysphagia, or sports drinks. In some examples, the retorted food product is a high-moisture food such as a liquid or semi-liquid.

The amount of starch composition which can be added and used in any given food may be determined to a great extent by the amount that can be tolerated by consumers of the food. In other words, the amount of starch composition used generally may be up to what is acceptable in organoleptic evaluation of the food. Preferably, the starch composition is used in an amount from about 0.1% to about 20%, by weight of the food, preferably from about 0.5% to about 16%, by weight of the food, more preferably from about 1% to about 12%, by weight of the food.

Starch compositions containing TI corn starch and varying amounts of tapioca starch were also evaluated for the same properties as the compositions containing TI corn starch and waxy corn or waxy rice. As shown below, the compositions with waxy corn or waxy rice performed better overall compared to the compositions with tapioca.

All percentages provided herein for starch compositions are weight percentages of the overall starch composition (dry solids basis).

RVA Comparison of TI Corn Starch and Compositions of TI Corn Starch with Waxy Corn or Waxy Rice An analysis was done to compare the viscosity profile of a TI corn starch to the viscosity profile of a starch composition comprising TI corn starch and a native starch. Specifically, the native starches used in the starch samples include waxy corn (at 5.5% solids), waxy rice (at 5% solids) and tapioca (at 5% solids). The viscosity profile of each of the native starches is shown in FIG. 1. The viscosity of the starches was measured using the RVA Perkins Elmer 4800 and heating each of the native starches to 95° C., holding for 2.7 minutes, then cooling to 50° C. and holding for 2 minutes. The RVA was operated at 160 revolutions per minute.

Table 1 below shows the components in each of the starch samples.

TABLE 1

| Starch samples for viscosity profile | | |
| --- | --- | --- |
| | Component 1 | Component 2 |
| 1 | TI corn starch 100% | N/A |
| 2 | TI corn starch 85% | Waxy rice 15% |
| 3 | TI corn starch 75% | Waxy rice 25% |

TABLE 1-continued

| Starch samples for viscosity profile | | |
| --- | --- | --- |
| | Component 1 | Component 2 |
| 4 | TI corn starch 50% | Waxy rice 50% |
| 5 | TI corn starch 85% | Waxy corn 15% |
| 6 | TI corn starch 75% | Waxy corn 25% |
| 7 | TI corn starch 50% | Waxy corn 50% |
| 8 | TI corn starch 85% | Tapioca 15% |
| 9 | TI corn starch 75% | Tapioca 25% |
| 10 | TI corn starch 50% | Tapioca 50% |

The TI corn starch used for component 1 was highly modified thermally inhibited waxy corn starch. The waxy rice used for component 2 was an unmodified, native waxy rice starch. The waxy corn used for component 2 was an unmodified, native waxy corn starch. The tapioca used for component 2 was an unmodified, native tapioca starch. (See FIG. 1 for the viscosity profile of the native waxy rice, native waxy corn and native tapioca.)

The RVA Perkins Elmer 4800 was used to measure a viscosity of each sample in Table 1 to compare the viscosity profiles. Each of the samples was 5.5% solids and heated to 120° C., held for 2.6 minutes (156 seconds), then cooled to 50° C. and held for 2 minutes (122 seconds). The RVA was operated at 160 revolutions per minute. Heating to 120° C. is relevant to a typically retort process of a food product containing the starch samples described herein.

Figure 2:
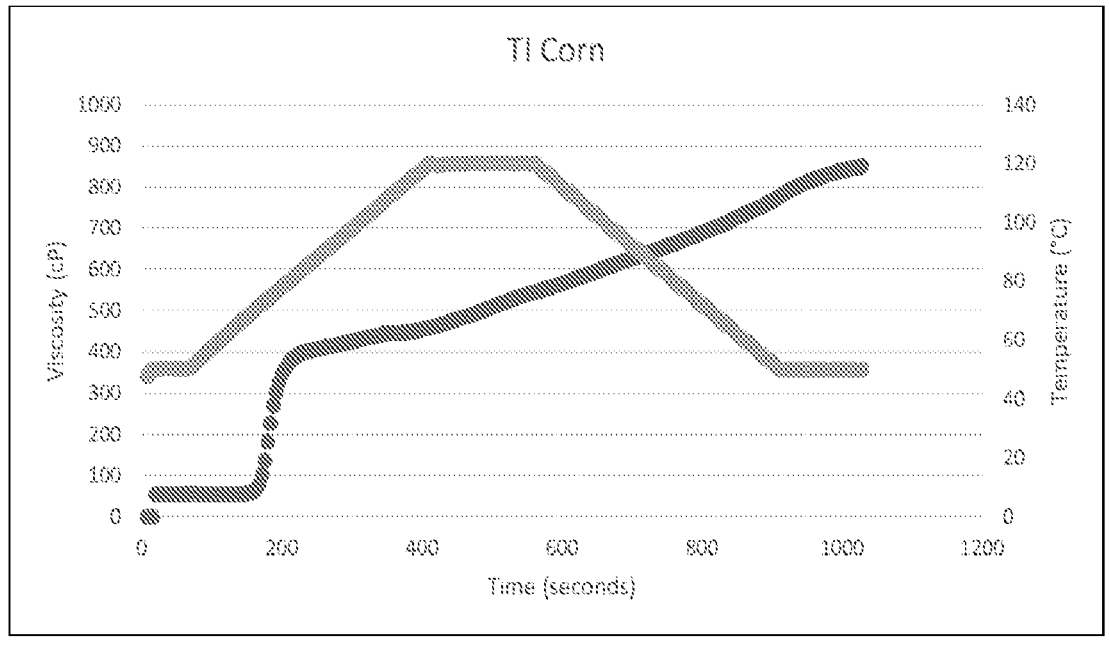
FIG. 2 is a plot of the viscosity profile, as a function of time and temperature, for TI corn starch.

FIGS. 2-11 show the RVA curve profile for samples 1-10 of Table 1 heated to 120° C. as described above. FIG. 2 shows the viscosity profile of the TI corn starch as a function of time and temperature. The TI corn starch continually increased and the maximum viscosity (which was at the end) was between 800 and 900 centipoise (cP).

Figure 3:
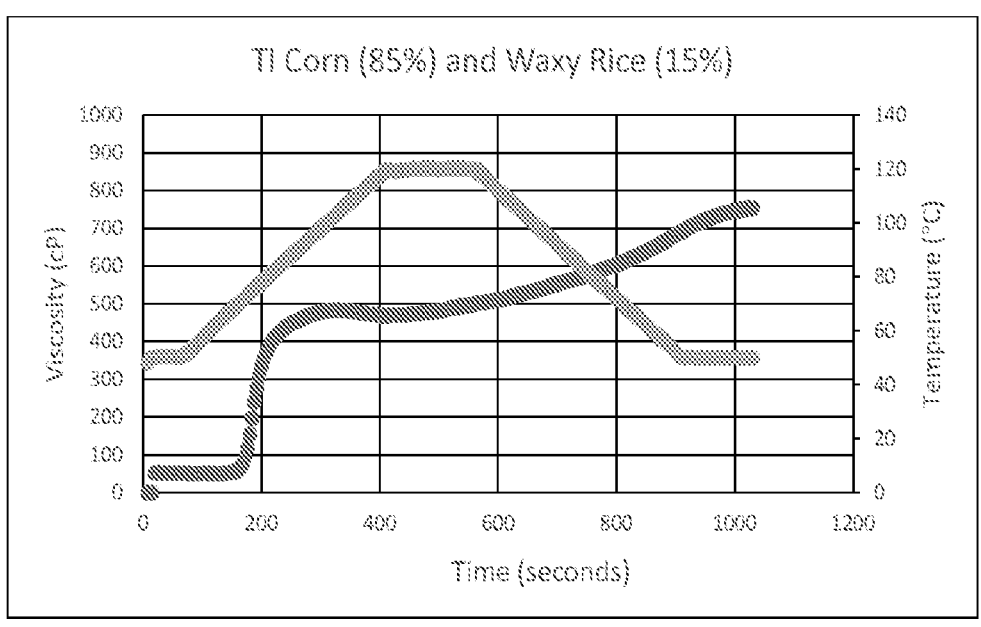
FIGS. 3-5 are plots of the viscosity profile for compositions of TI corn starch and waxy rice at varying levels (15%, 25% and 50%).
Figure 4:
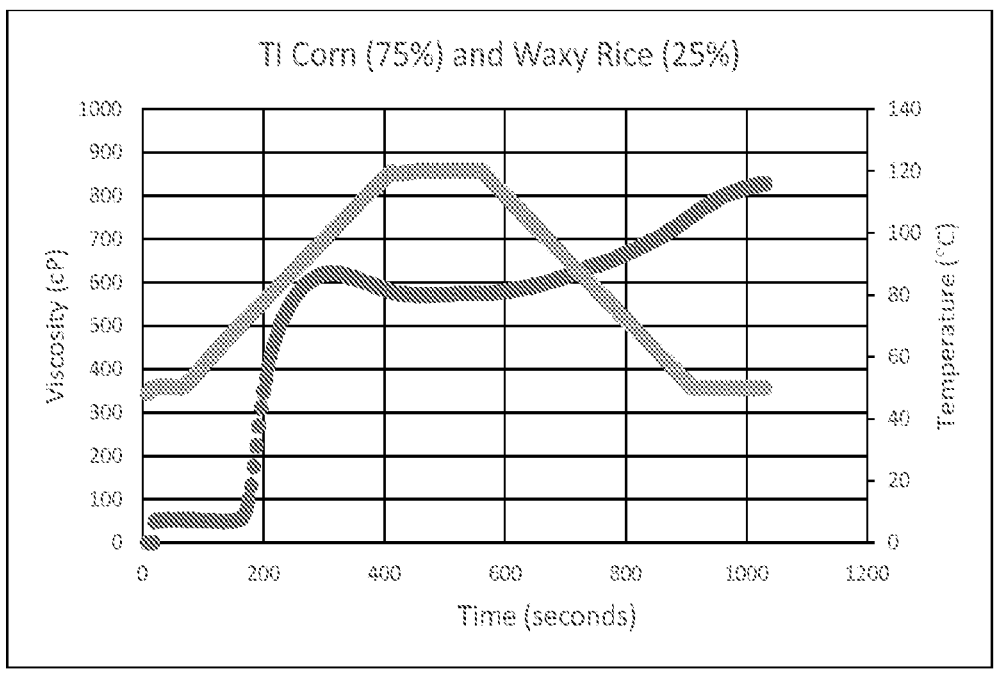
Figure 5:
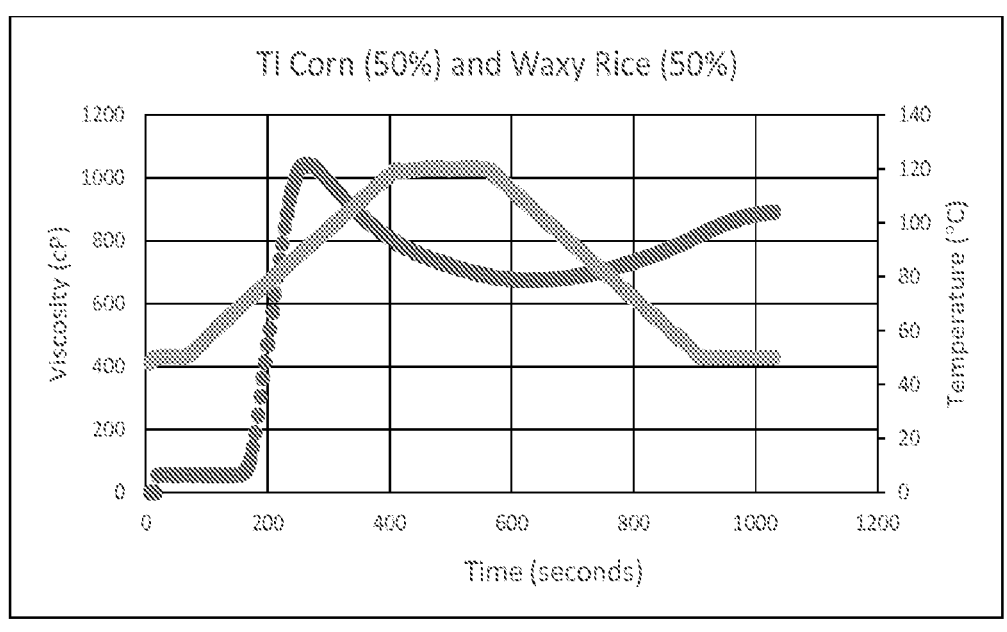

FIGS. 3 and 4 (composition with waxy rice at 15% and 25%, respectively) each show a decrease in viscosity around 400 seconds followed by an increase and the maximum viscosity at the end. FIG. 5 (composition with waxy rice at 50%) shows a maximum or peak viscosity (about 1000 centipoise) between 200 and 300 seconds followed by a large decrease and a final viscosity between 800 and 900 centipoise.

Figure 6:
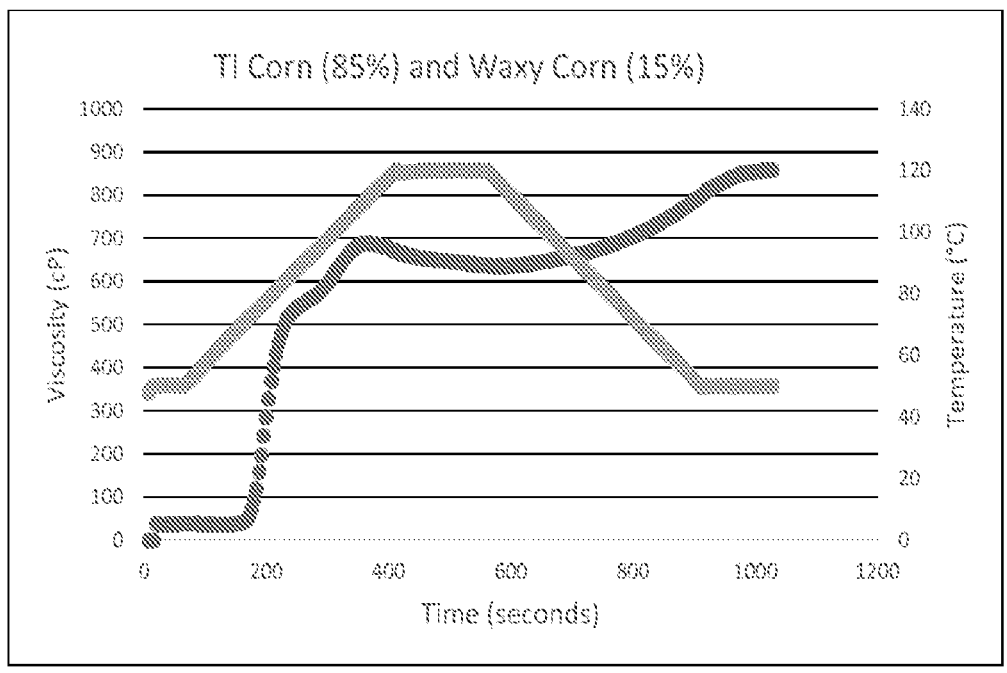
FIGS. 6-8 are plots of the viscosity profile for compositions of TI corn starch and waxy corn at varying levels (15%, 25% and 50%).
Figure 7:
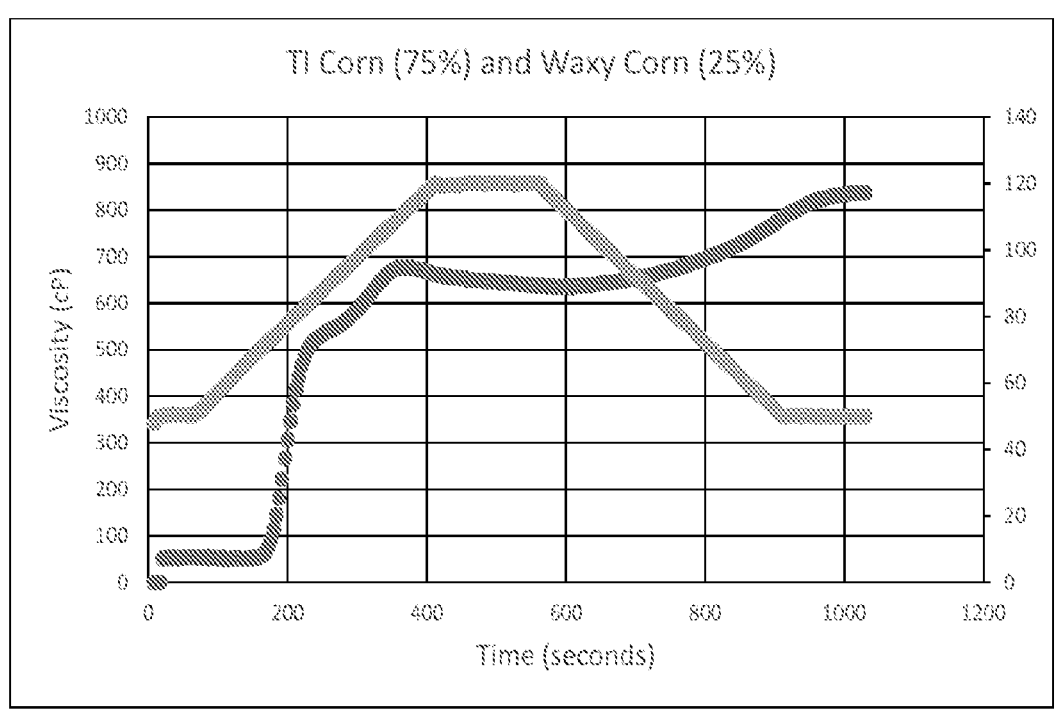
Figure 8:
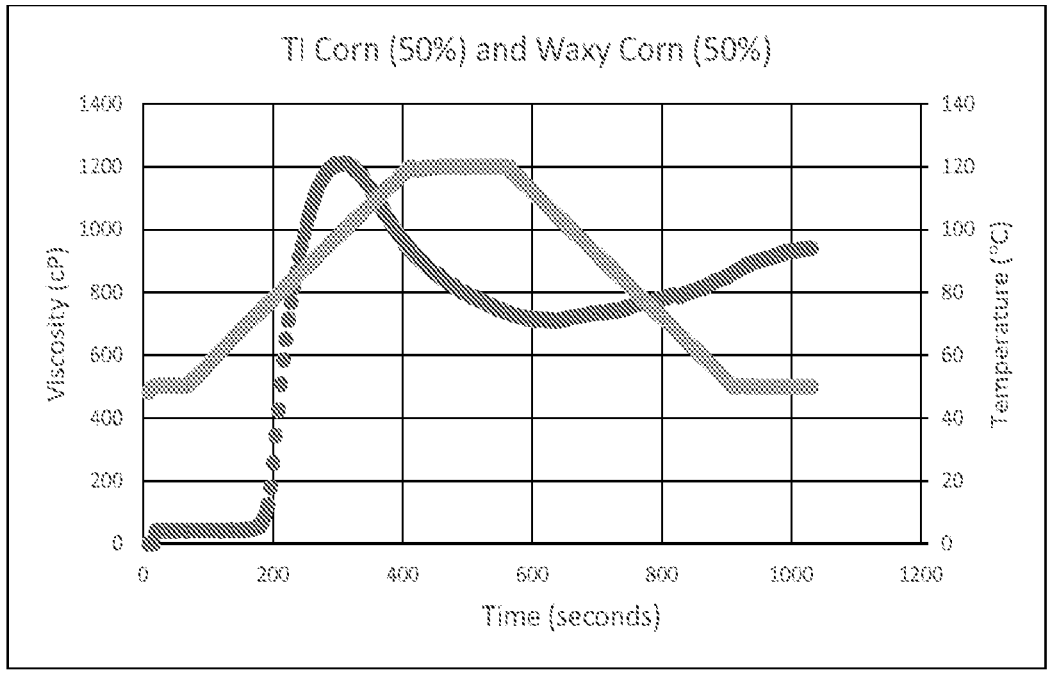

FIG. 6 (composition with waxy corn at 15%) shows that the maximum viscosity was at the end and between 800 and 900 centipoise. FIG. 7 (composition with waxy corn at 25%) shows a viscosity profile similar to the viscosity profile in FIG. 6 but the end maximum viscosity is a bit less comparatively (but greater than 800 centipoise). FIG. 8 (composition with waxy corn at 50%) shows a maximum or peak viscosity (about 1200 centipoise) between 200 and 400 seconds followed by a significant dip and an ending viscosity greater than 900 centipoise.

Figure 9:
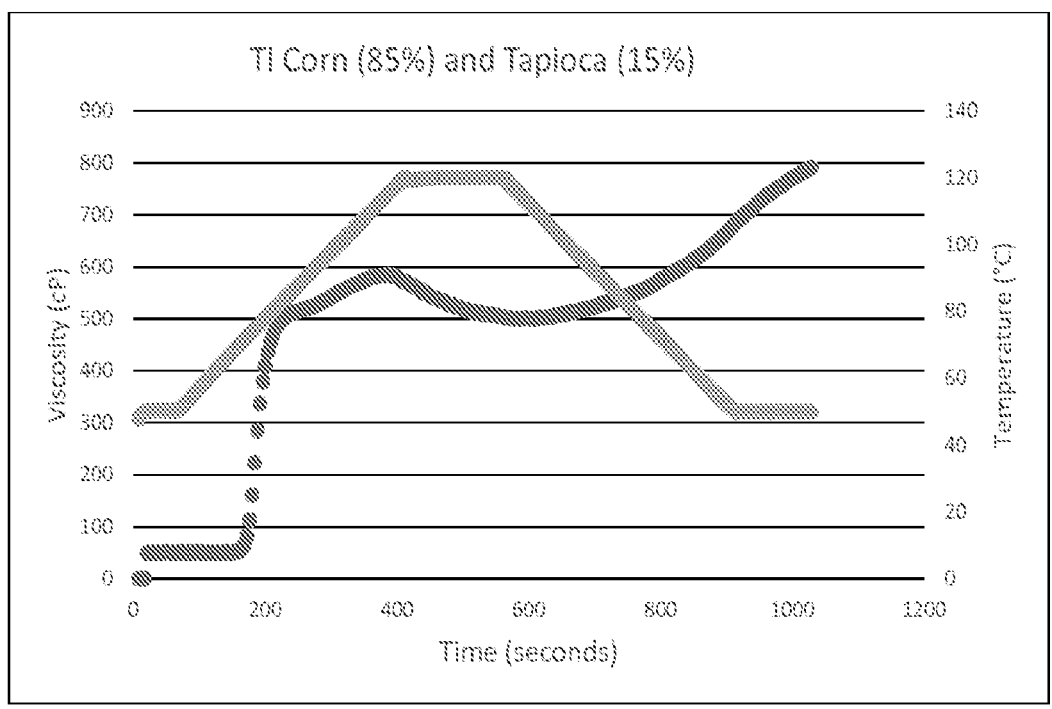
FIGS. 9-11 are plots of the viscosity profile for compositions of TI corn starch and tapioca at varying levels (15%, 25% and 50%).
Figure 10:
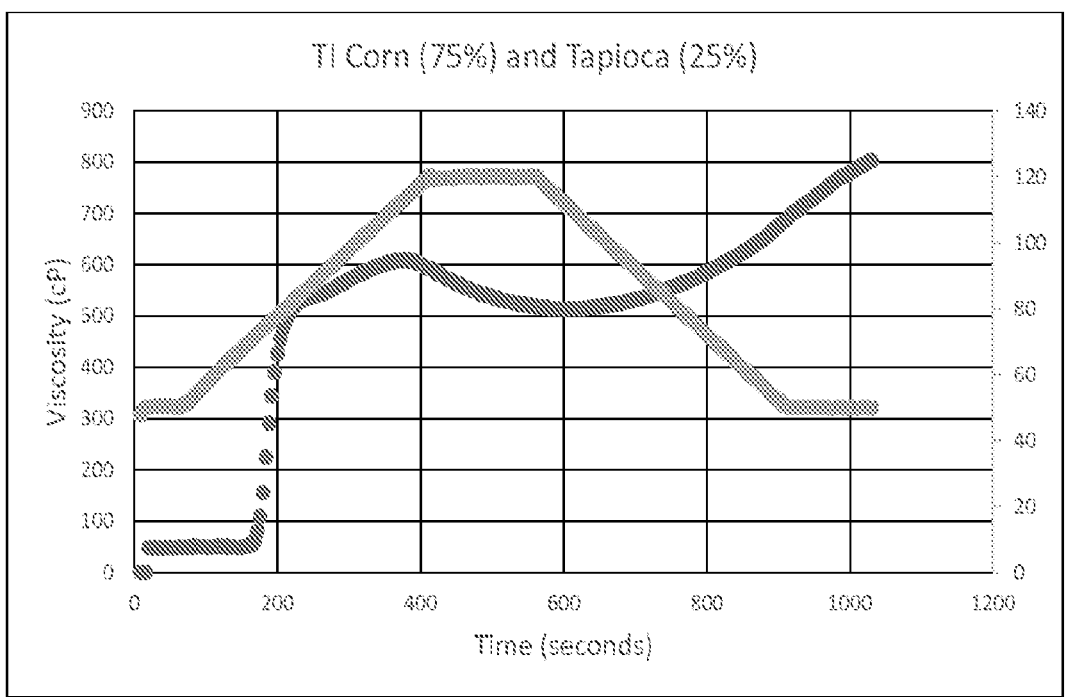
Figure 11:
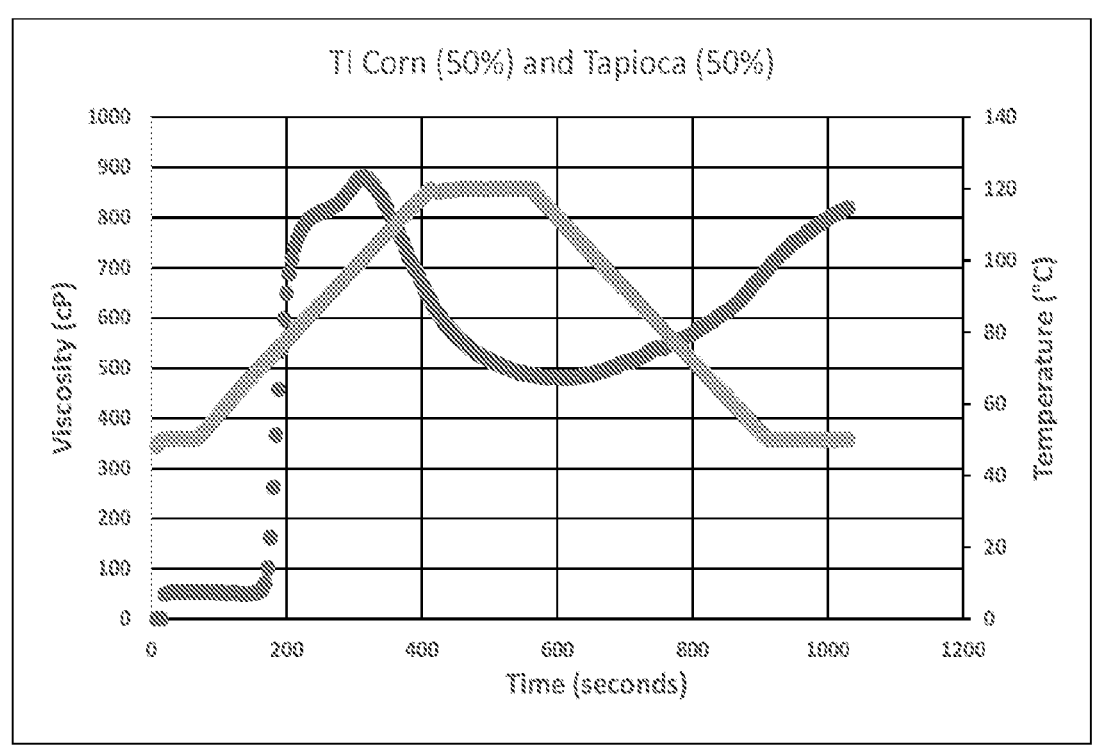

FIG. 9 (composition with tapioca at 15%) shows a dip in viscosity followed by an increase with the maximum viscosity (close to 800 centipoise) at the end. FIG. 10 (composition with tapioca at 25%) shows a viscosity profile similar to the viscosity profile in FIG. 9. FIG. 11 (composition with tapioca at 50%) shows a maximum or peak viscosity (about 900 centipoise) between 200 and 400 seconds followed by a significant decrease and an ending viscosity of about 800 centipoise.

The results in FIGS. 3-11 show that the native starch additions at 15% and 25% of the composition are preferred to the native starch at 50% of the composition. When the composition includes 50% of the native starch, the peak viscosity of the composition is significantly higher than the control (FIG. 2, 100% TI corn starch). This increase in peak viscosity seen at 50% can be undesirable in a retort process because it will take longer to retort the product to 6 $F_O$ and thus more energy and processing time is required. A starch that is more viscous early in the retort process has a lower heat transfer and thus the starch takes more time to heat up to the required temperature in retort. Given that the end viscosity of all the samples in FIGS. 3-11 are generally similar, when the viscosity peaked for each sample is a major factor in evaluating that particular sample.

Refrigeration Stability:

The starch samples of Table 1 were run in the RVA at 120° C. using the method described above under RVA comparison. Each sample was then divided into 10 separate 25 ml centrifuge tubes. The tubes were stored in a refrigerator at 4° C. for up to 36 days. Starting at day 0 and every 9 days after, two test tubes of each sample were removed from the refrigerator, allowed to equilibrate to room temperature, centrifuged at 5000 RPM for 10 minutes, and the free liquid from each was weighed. Syneresis was determined to be the amount of free liquid minus the free liquid at day 0 for that sample, divided by the total mass of the sample. The average of the syneresis for the two samples was calculated.

Figure 12A:
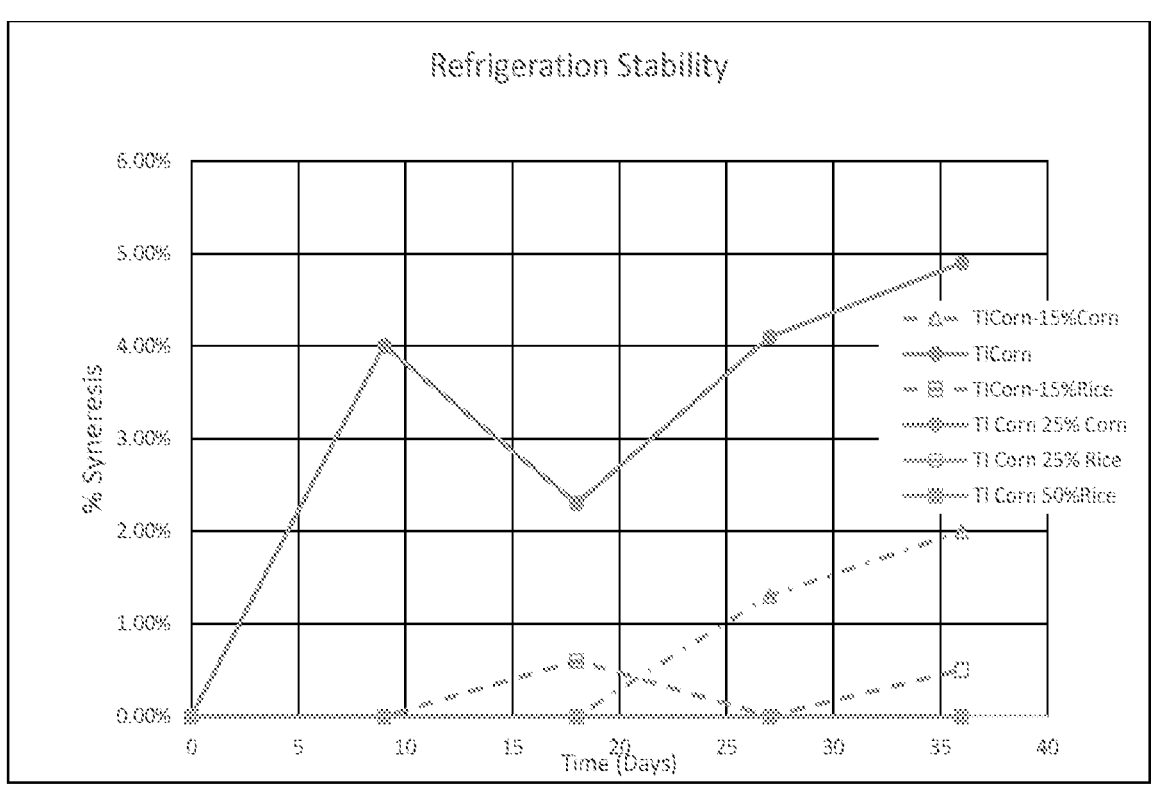
FIGS. 12A and 12B are plots of syneresis as a function of refrigeration time for starch compositions compared to 100% TI corn starch.
Figure 12B:
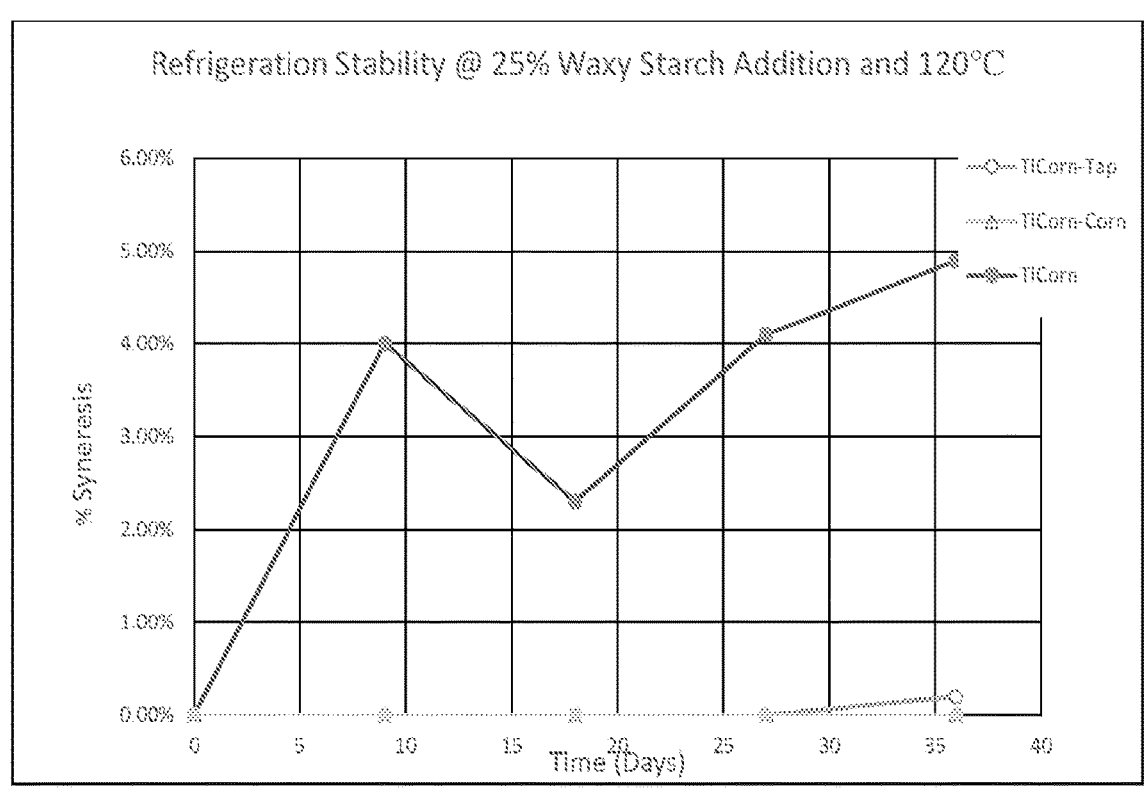

FIGS. 12A and 12B show syneresis as a function of refrigeration time after starch gelatinization using the RVA at 120° C. FIGS. 12A and 12B illustrate that the starch compositions had lower syneresis as compared to the TI corn starch. Specifically, in FIG. 12A TI corn starch had a syneresis of almost 5% after about 35 days, whereas the composition with 15% corn was about 2% syneresis and the composition with 15% rice was less than 1% syneresis. Syneresis for the compositions with 25% corn, 25% rice and 50% rice are not even visible on the graph in FIG. 12A. FIG. 12B illustrates that syneresis for the composition with 25% tapioca was barely visible on the graph in FIG. 12B. The results in FIGS. 12A and 12B demonstrate that the waxy rice and waxy corn helped to prevent water from leaking out of the starch.

The present application will be further described in the following examples, which do not limit the scope of the invention in the claims.

EXAMPLES

The starch compositions of TI corn starch with varying amounts of waxy corn or waxy rice were used in a chicken soup formulation and the performance was compared to TI corn starch alone. The chicken soup formulations (see Table 2) underwent a series of freeze/thaw cycles as described below.

TABLE 2

| Recipe for chicken soup with 4% starch | |
| --- | --- |
| Ingredient | Amount |
| Swanson Chicken Broth (unsalted) | 74.5% |
| Heavy cream (Kemps) | 11.0% |
| Kirkland Premium Chunk Chicken Breast (can) | 9.0% |
| Salt (Top-Flo, Cargill) | 1.5% |
| Starch (varies) | 4.0% |
| | 100.0% |

Various samples of the chicken soup recipe with different starch compositions are shown in Table 3 below. The starch products used were the same as those shown in Table 1.

TABLE 3

| Starch formulations for use in chicken soup recipe | |
| --- | --- |
| 1 | TI corn starch only |
| 2 | TI corn starch 85%/waxy rich 15% |
| 3 | TI corn starch 75%/waxy rice 25% |
| 4 | TI corn starch 50%/waxy rice 50% |
| 5 | TI corn starch 85%/waxy corn 15% |
| 6 | TI corn starch 75%/waxy corn 25% |
| 7 | TI corn starch 50%/waxy corn 50% |
| 8 | TI corn starch 85%/tapioca 15% |
| 9 | TI corn starch 75%/tapioca 25% |
| 10 | TI corn starch 50%/tapioca 50% |

Retort:

The soup samples underwent thermal processing/retort using an Allpax 2402 Model operated as a rotary retort at 20 RPM and 256° F. to achieve a degree of lethality of 6 $F_O$. The retort process can commonly be used in the food industry to prevent the formation of *Clostridium botulinum* (C. Botulinum) toxin and enable the soup (or other type of food product) to be stored at room temperature for its intended shelf life.

The viscosity of the soup samples was measured after retort using a Brookfield DV1 Digital Viscometer (Middleboro, USA). Table 4 below shows the testing conditions and the post-retort viscosity.

TABLE 4

| Post-retort viscosity of the soup samples | | | | |
| --- | --- | --- | --- | --- |
| Starch composition | Spindle | RPM | Temp (° F.) | Post-retort viscosity (cp) |
| 1 TI corn starch only | 5 | 50 | 70 | 1547 |
| 2 TI corn starch 85%/ waxy rice 15% | 3 | 50 | 70 | 1496 |
| 3 TI corn starch 75%/ waxy rice 25% | 3 | 50 | 70 | 1143 |
| 4 TI corn starch 50%/ waxy rice 50% | 3 | 50 | 70 | 861 |
| 5 TI corn starch 85%/ waxy corn 15% | 3 | 50 | 70 | 1267 |
| 6 TI corn starch 75%/ waxy corn 25% | 3 | 50 | 70 | 1255 |
| 7 TI corn starch 50%/ waxy corn 50% | 3 | 50 | 70 | 827 |
| 8 TI corn starch 85%/ waxy corn 15% | 3 | 50 | 70 | 1429 |
| 9 TI corn starch 75%/ Tapioca 25% | 3 | 50 | 70 | 1264 |
| 10 TI corn starch 50%/ Tapioca 50% | 3 | 50 | 70 | 765 |

The results in Table 4 show that the soups having the starch composition with 15% waxy rice and 15% waxy corn had post-retort viscosities closest to the soup having TI corn starch only. Table 4 also illustrates that the soups having a 50/50 composition of T1 corn starch and native starch had the lowest post-retort viscosity.

Figure 13:
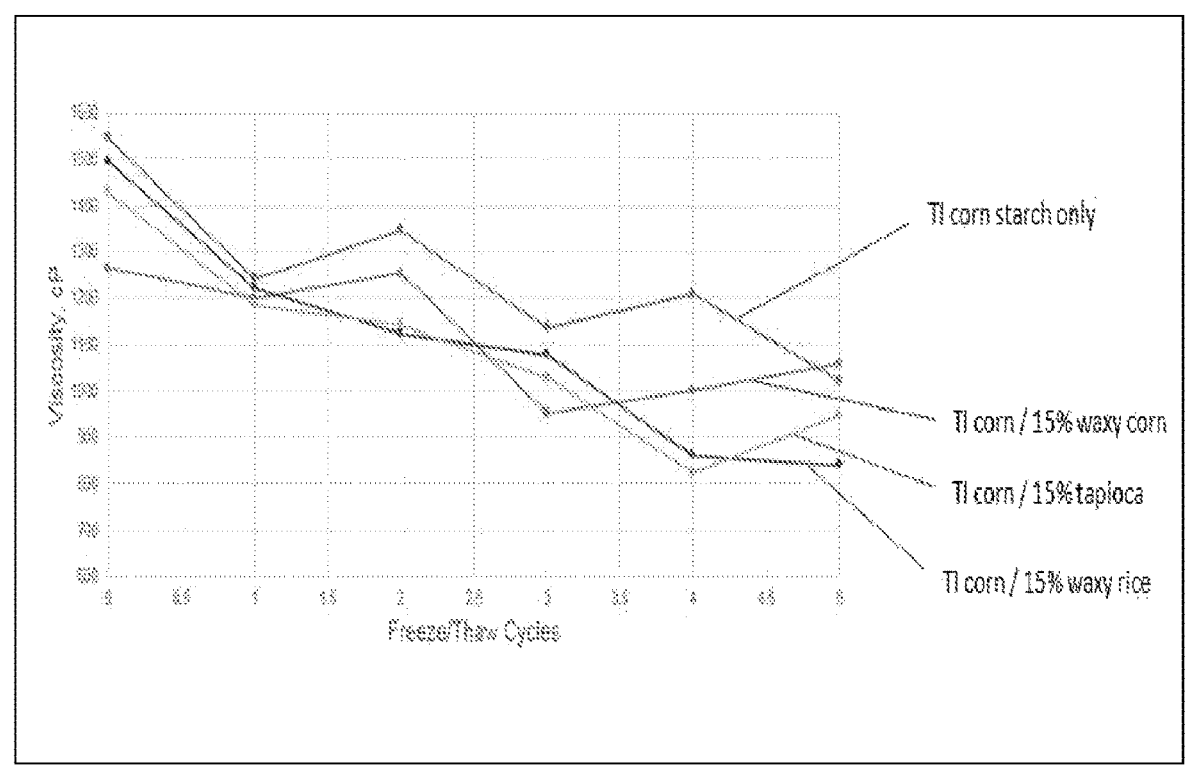
FIG. 13 is a plot of the viscosity of soup samples as a function of freeze/thaw cycle for samples having 100% TI corn starch to samples having an 85/15 percentage composition of TI corn starch with waxy corn, waxy rice and tapioca.
Figure 14:
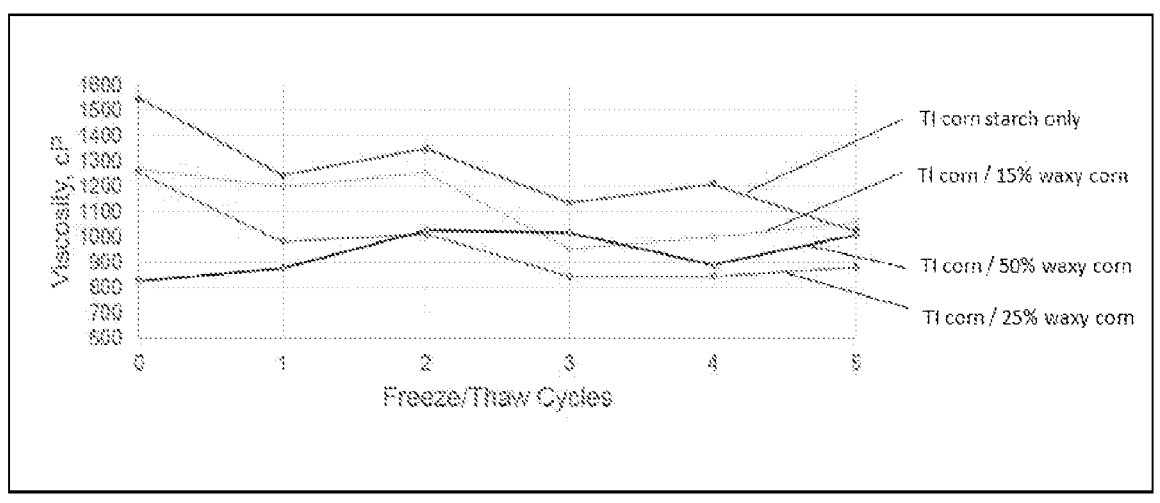
FIG. 14 is a plot of the viscosity of soup samples as a function of freeze/thaw cycle for samples having 100% TI corn starch to samples having a composition of TI corn starch with waxy corn at percentages of 85/15, 75/25, and 50/50.

Slow Freeze/Thaw Method:

Each retorted soup sample (containing each of the eight starch formulations of Table 3) was distributed into six 5.5 oz plastic cups and covered with a lid. One of the six cups for each formulation was placed in a refrigerator for later analysis (these samples underwent zero freeze/thaw cycles). The remaining five cups for each formulation were placed in an insulated foam box and frozen for three days. After three days, a sample for each formulation was removed from the freezer and thawed in the foam box at room temperature for 3 days and then removed for analysis (one freeze thaw/cycle). The process was repeated for five freeze/thaw cycles.
Viscosity:

The viscosity was measured for each soup sample after each freeze/thaw cycle using the Brookfield DV1 Digital Viscometer. FIG. 13 compares the viscosity of the soup samples having TI corn starch only to the soup samples having the 85/15 composition of TI corn starch with waxy corn, waxy rice and tapioca. FIG. 14 compares the viscosity of the soup samples having TI corn starch only to the soup samples having a composition of TI corn starch/waxy corn at each of the combinations (85/15, 75/25, 50/50).

FIG. 13 illustrates that, before undergoing any freeze/thaw cycles, the greatest viscosity difference was between the soup having TI corn starch only and the soup having a composition of 85% TI corn starch and 15% waxy corn. However, after five freeze/thaw cycles, the viscosity of these two soup samples were generally the same. For the soups having the other two compositions (85% TI corn starch and 15% waxy rice; 85% TI corn starch and 15% tapioca), the viscosity generally tracked with the soup having TI corn starch only, although the soup having a composition of TI corn starch and waxy rice had the lowest viscosity after five freeze/thaw cycles.

FIG. 14 illustrates that, before undergoing any freeze/thaw cycles, the viscosity of the soup having TI corn starch only had a higher viscosity than the soups having the starch compositions of TI corn starch and waxy corn at 15%, 25% and 50%. However, after five freeze/thaw cycles, there was little to no viscosity difference between the soup having TI corn starch only and the soups having the starch compositions of TI corn starch and waxy corn at 15%, 25% and 50%.
Rheology:

Data for flow curves and temperature sweeps was also collected for each soup sample after each freeze/thaw cycle.

FIGS. 15-24 are flow curves for the soup samples containing each of starch formulations 1-10 of Table 3 above. The graphs of FIGS. 15-24 show viscosity as a function of shear rate. Each sample was placed on a rotational rheometer (Model: Anton Paar, Make: Physica MCR) and the measured viscosity is plotted against the shear rate.

FIGS. 25-34 are temperature sweeps for the soup samples containing each of starch formulations 1-10 of Table 3 above. The graphs of FIGS. 25-34 show viscosity as a function of temperature. Each sample was placed on a heated platform and the measured viscosity is plotted against the temperature.

Figure 15:
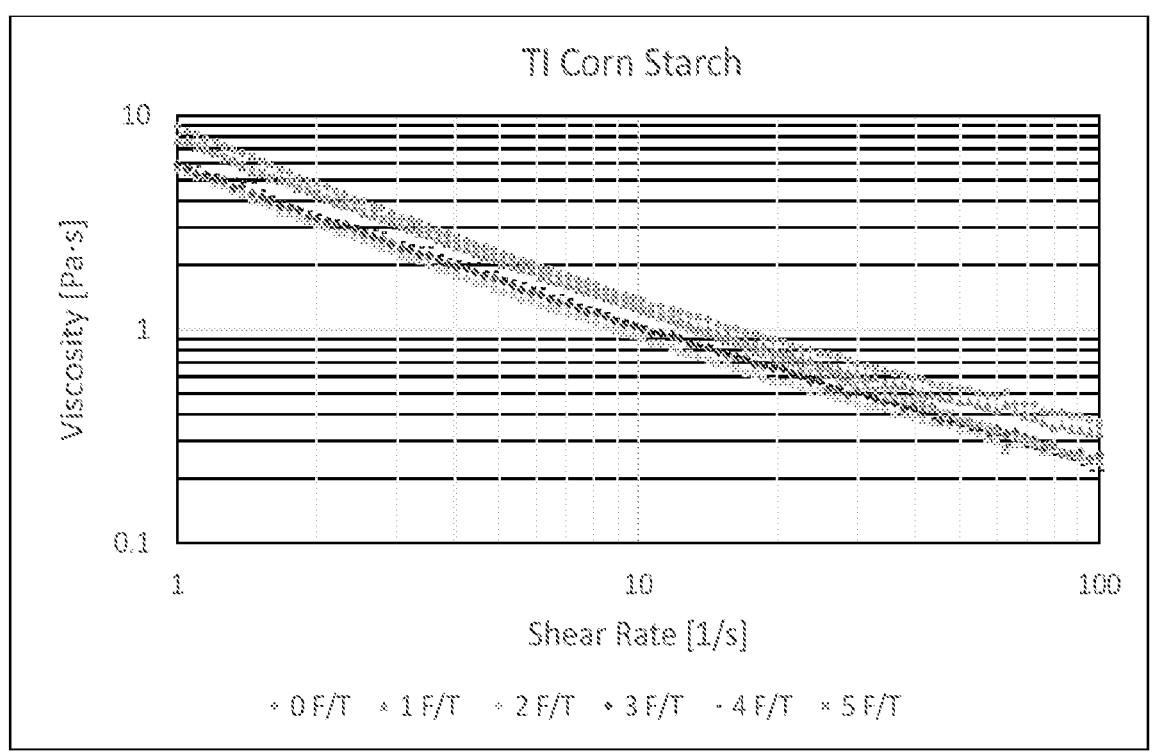
FIG. 15 is a plot of flow curves for soup samples having 100% TI corn starch for each of five freeze/thaw cycles.
Figure 16:
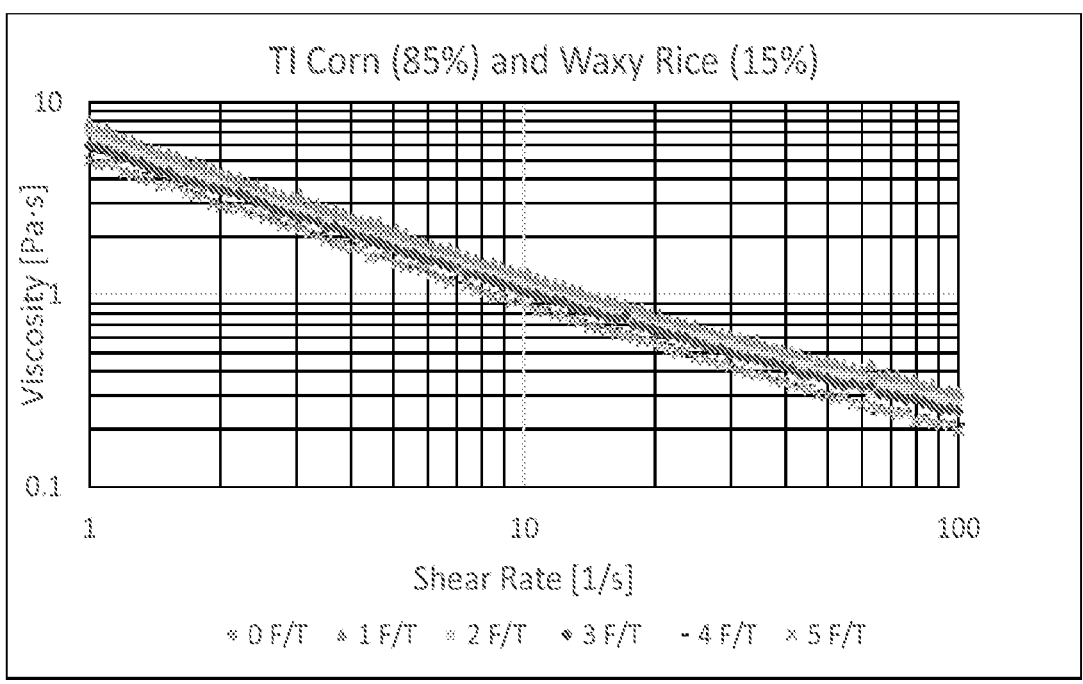
FIGS. 16-24 are plots of flow curves for various soup samples having compositions of TI corn starch with another starch for each of five freeze/thaw cycles.
Figure 17:
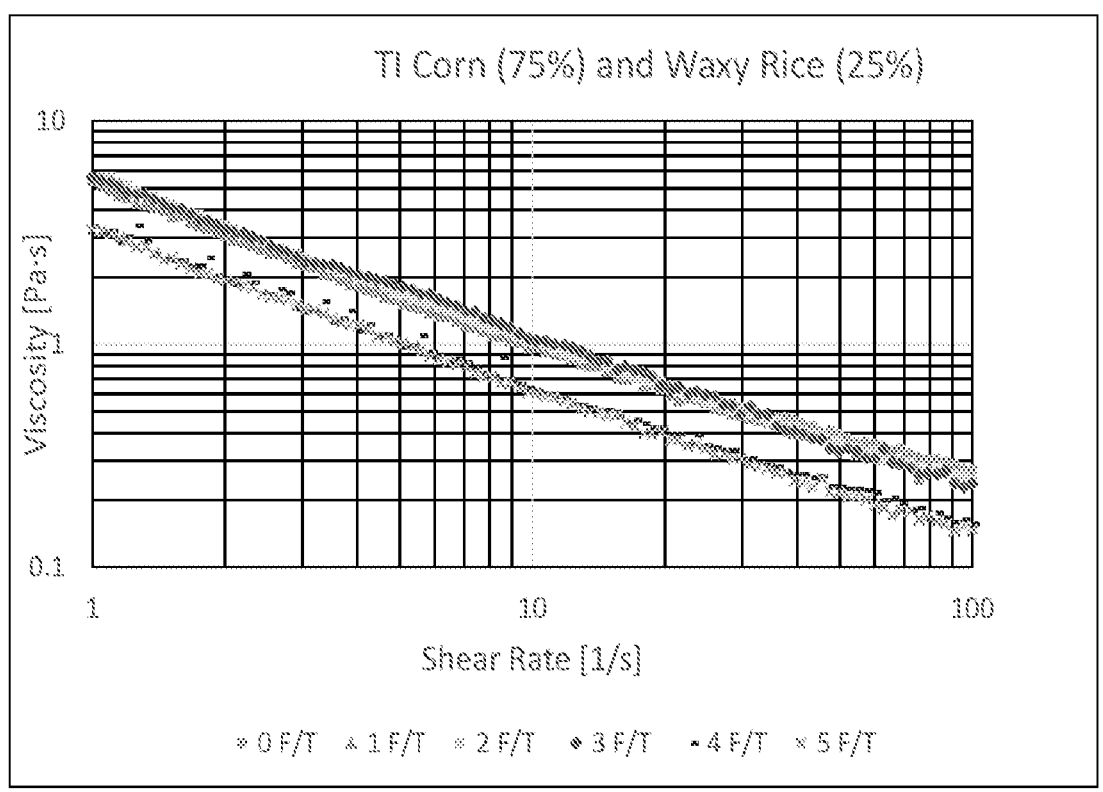
Figure 18:
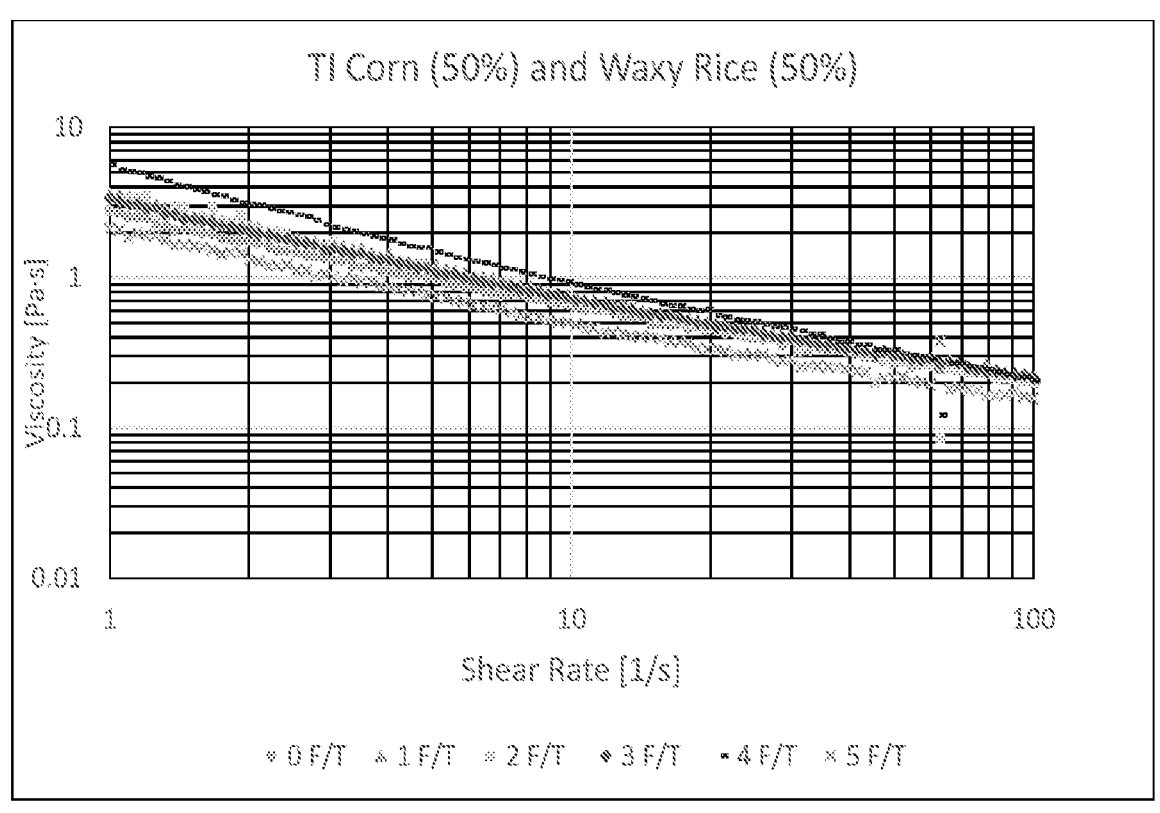
Figure 19:
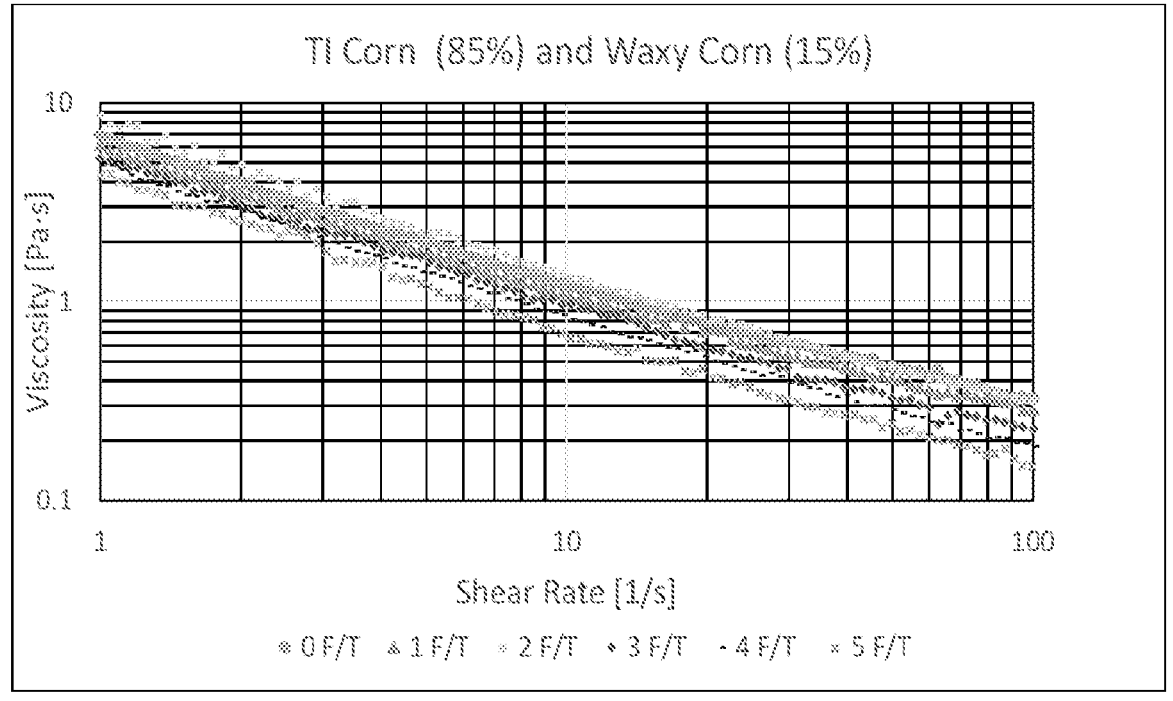
Figure 20:
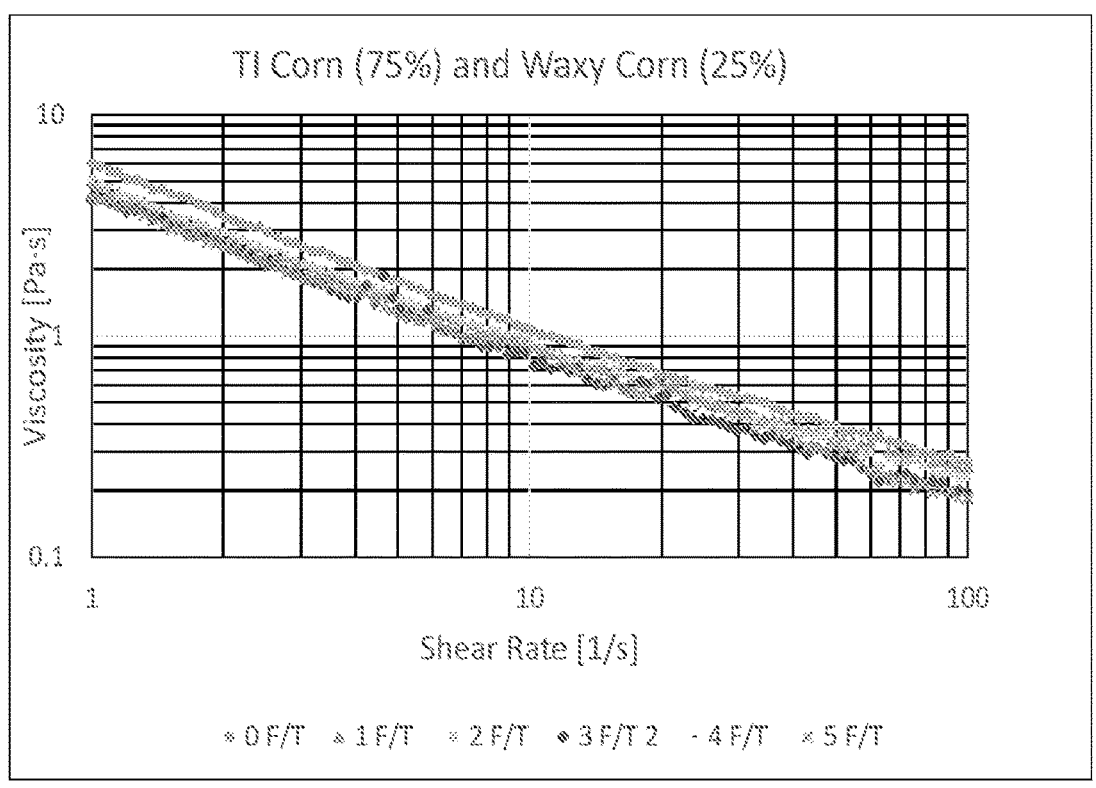
Figure 21:
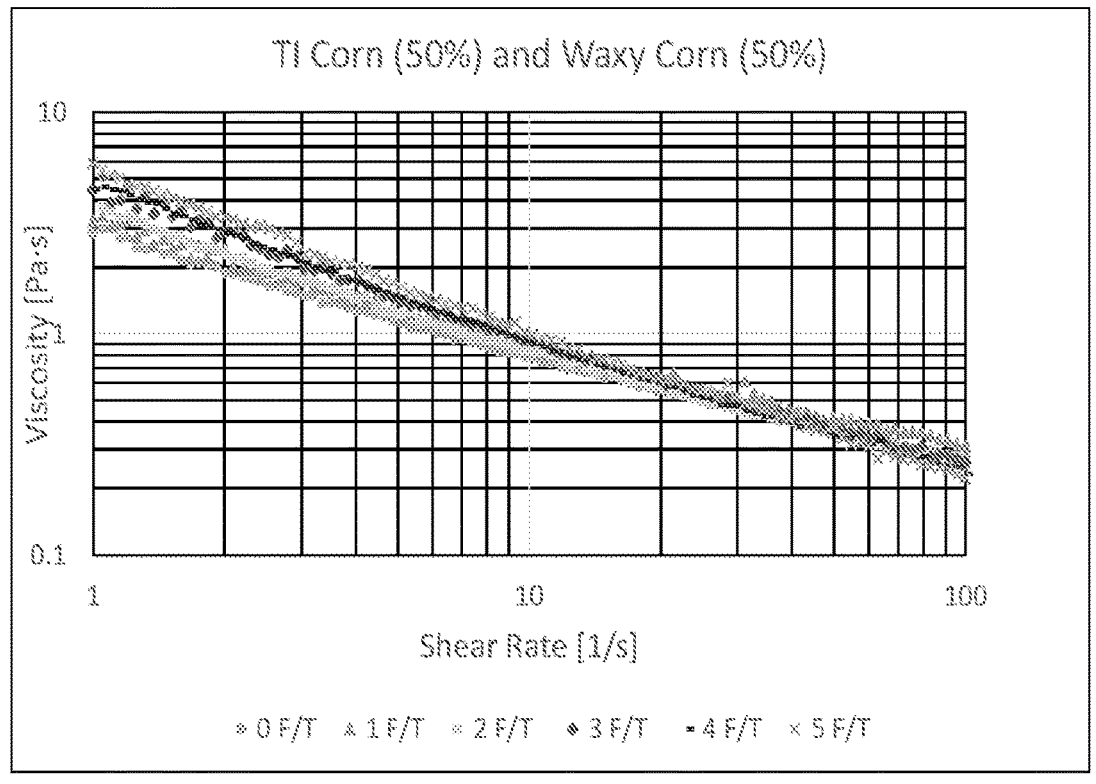
Figure 22:
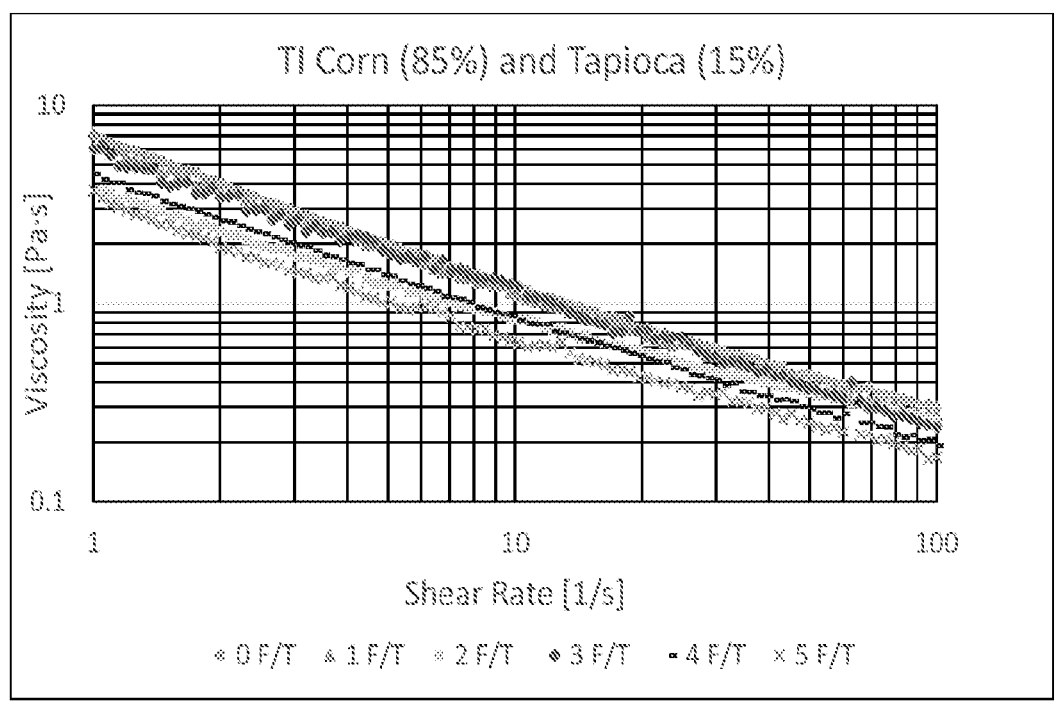
Figure 23:
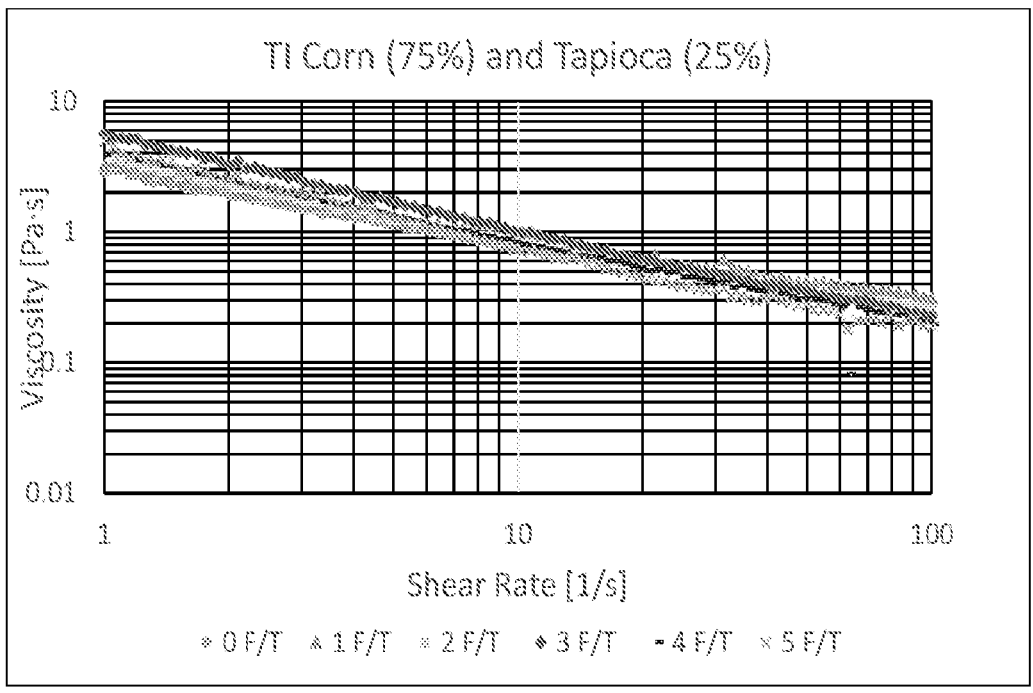
Figure 24:
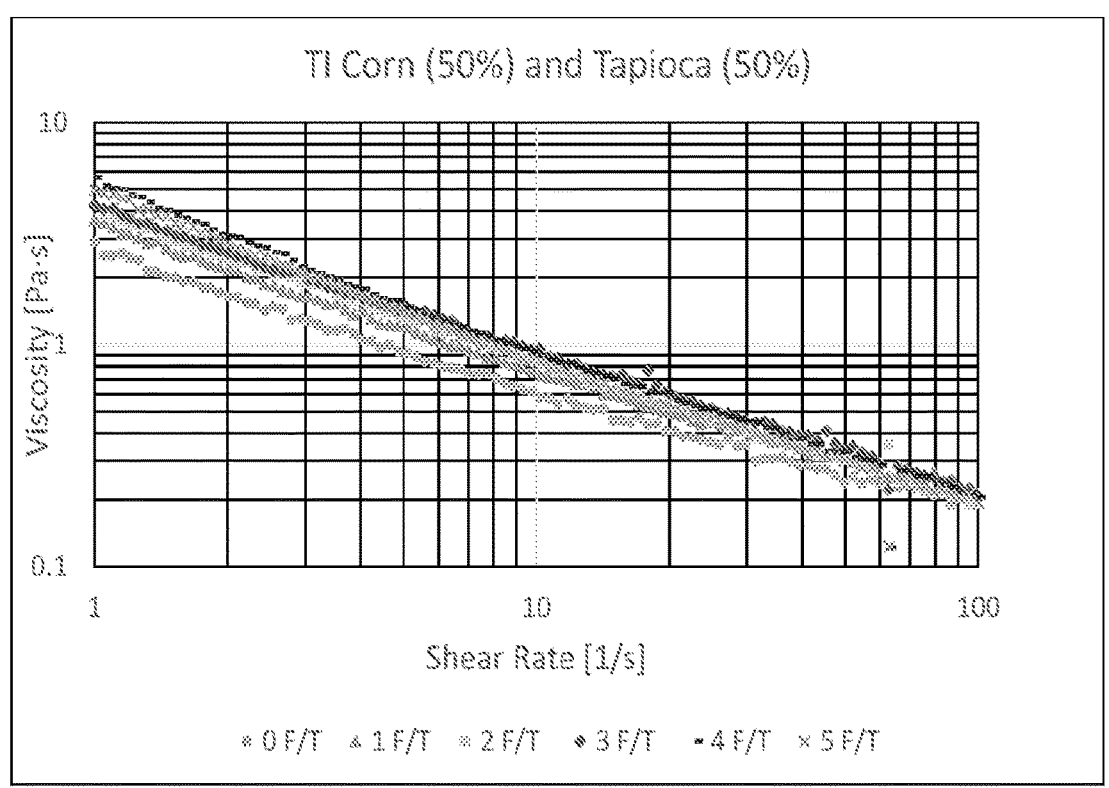
Figure 25:
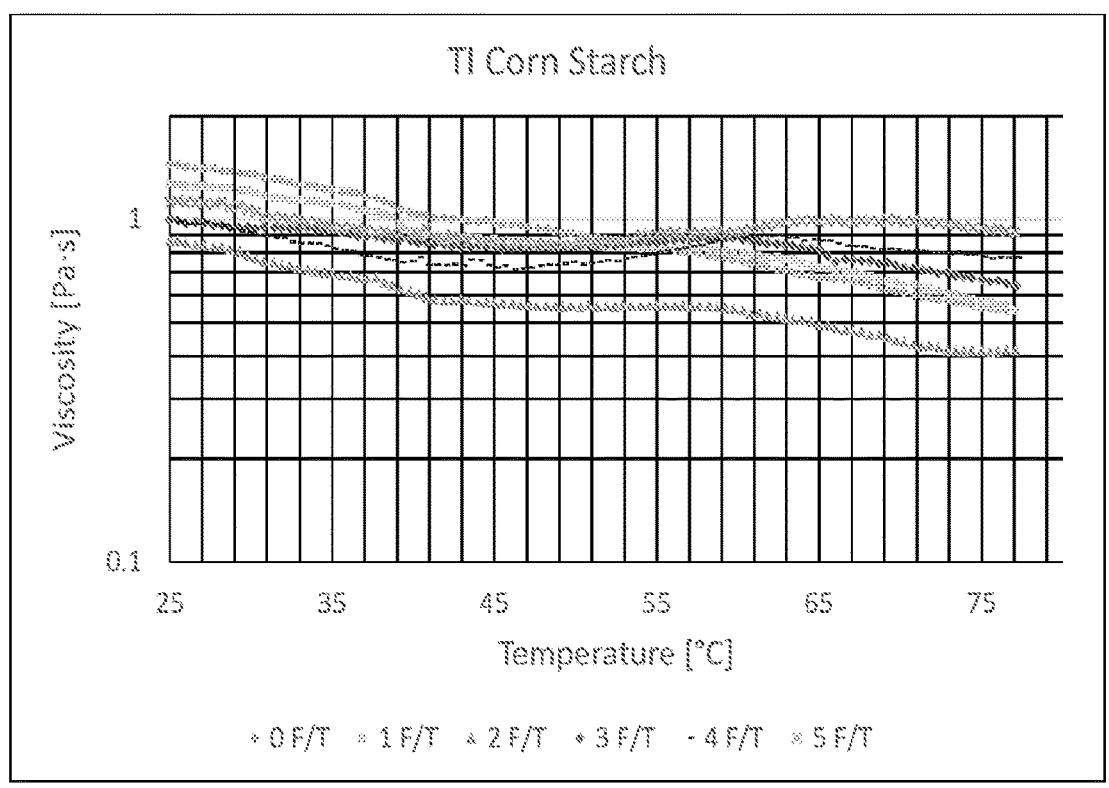
FIG. 25 is a plot of temperature sweeps for soup samples having 100% TI corn starch for each of five freeze/thaw cycles.
Figure 26:
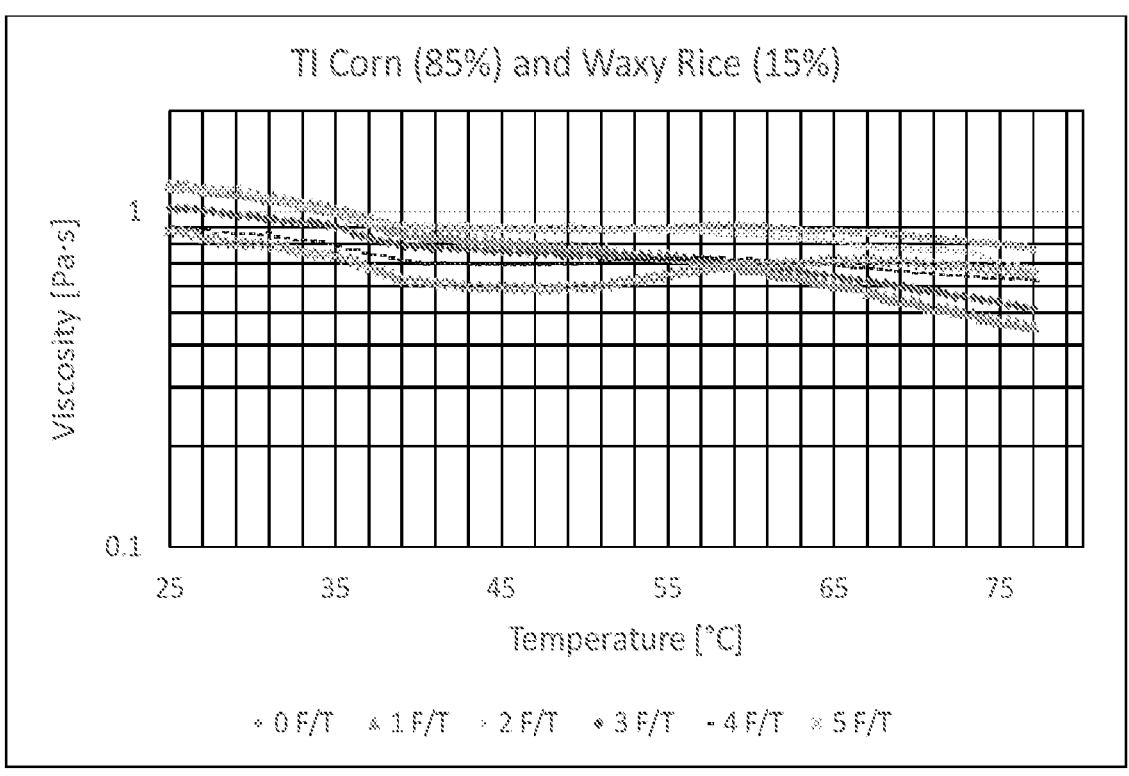
FIGS. 26-34 are plots of temperature sweeps for various soup samples having compositions of TI corn starch with another starch for each of five freeze/thaw cycles.
Figure 27:
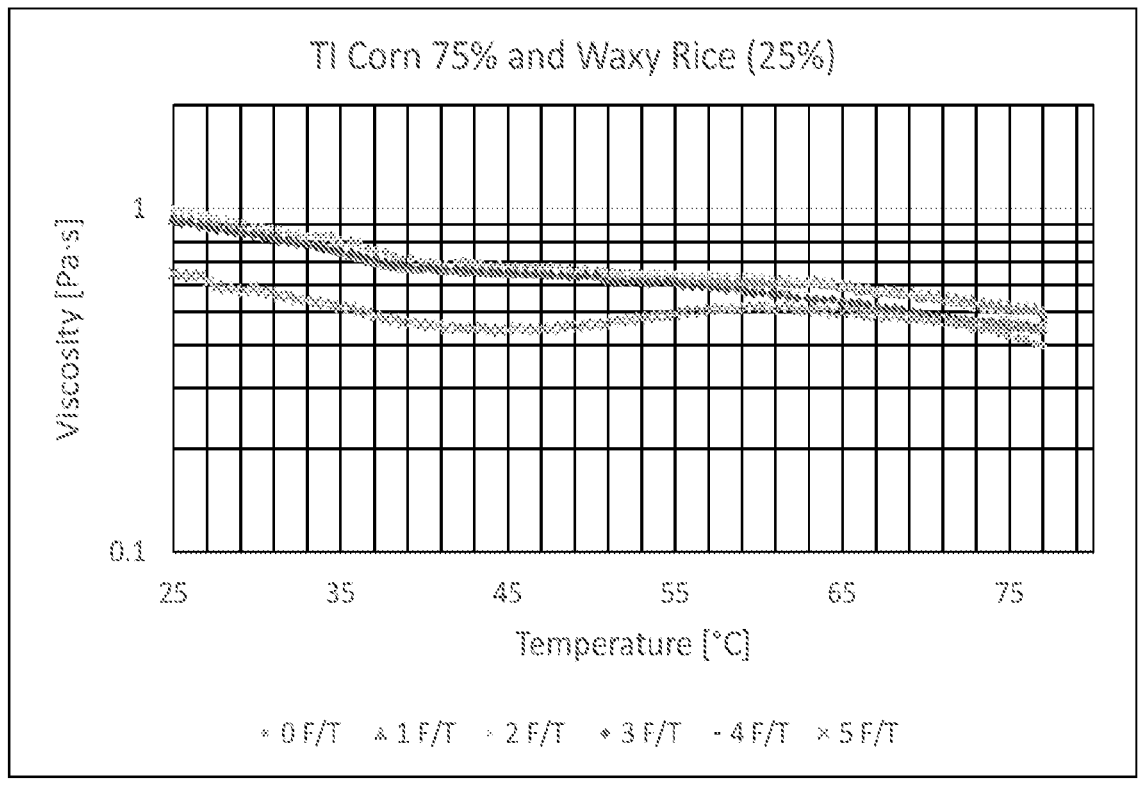
Figure 28:
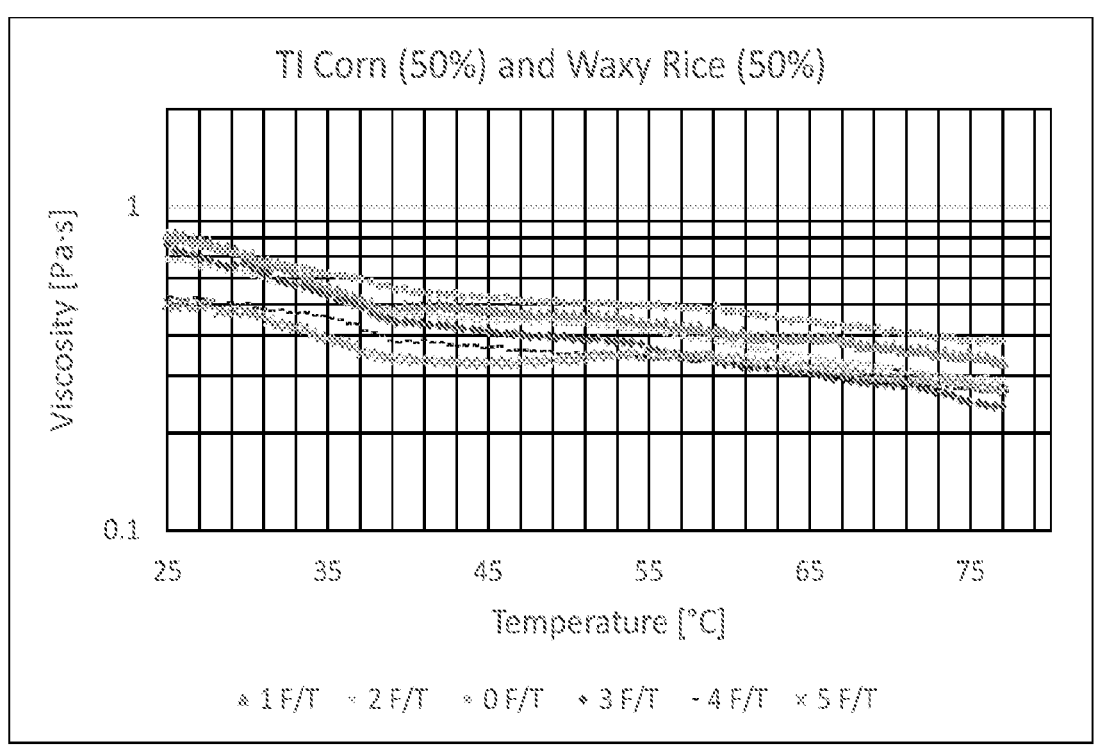
Figure 29:
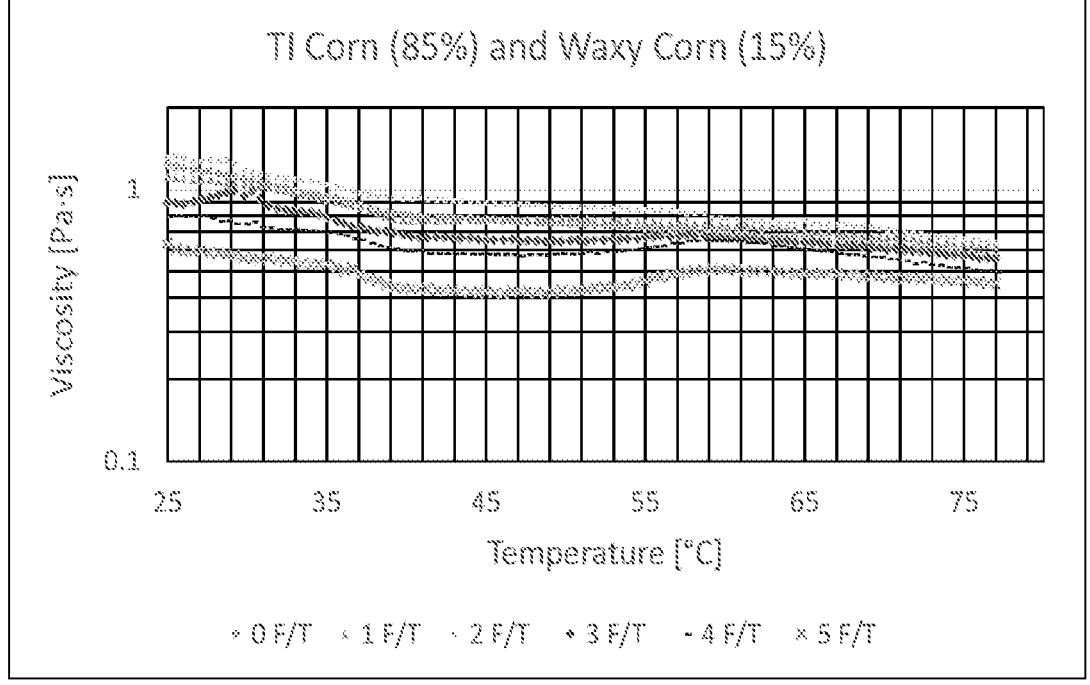
Figure 30:
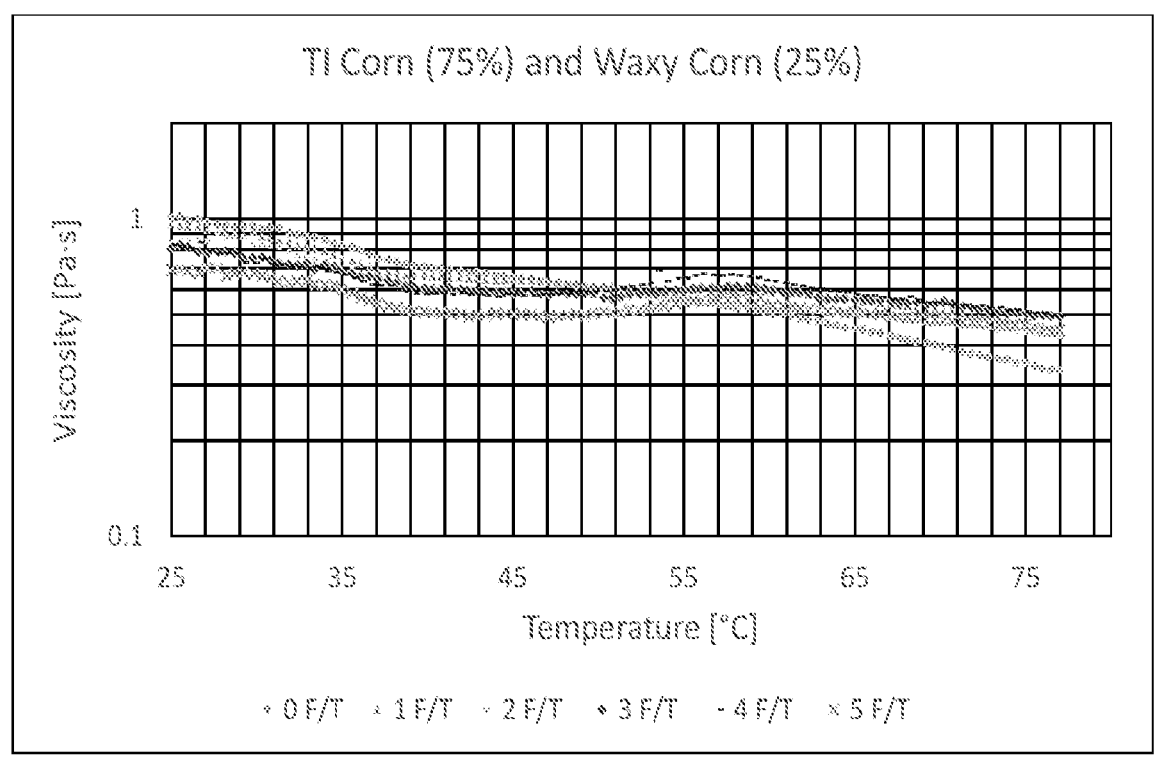
Figure 31:
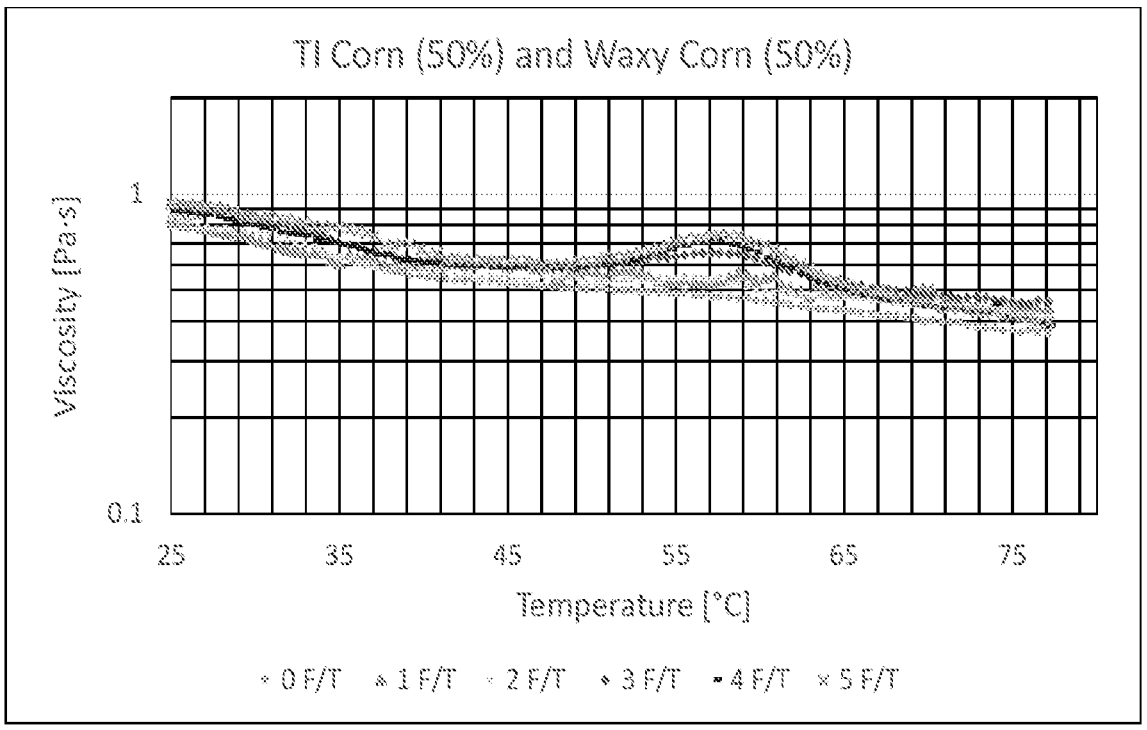
Figure 32:
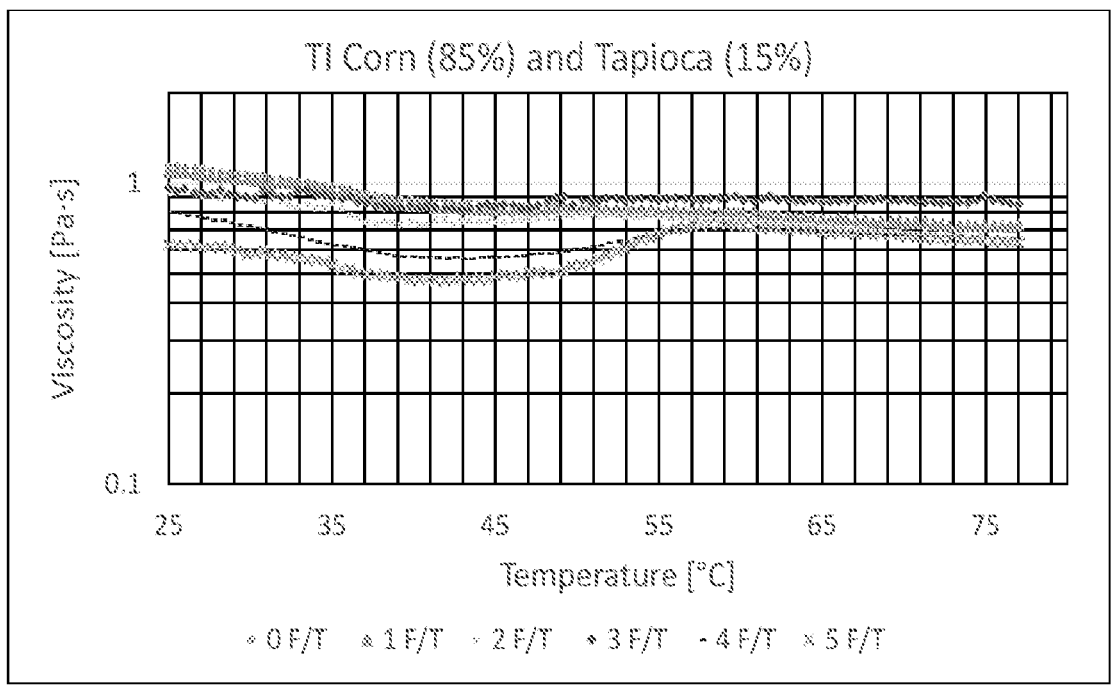
Figure 33:
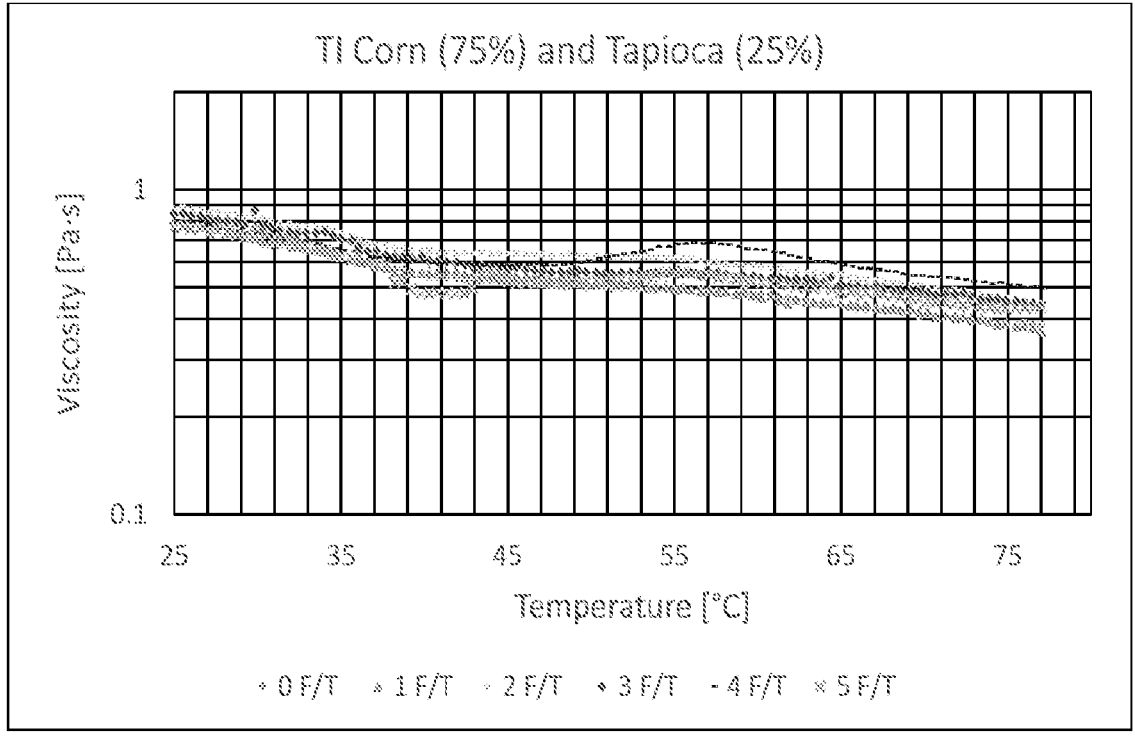
Figure 34:
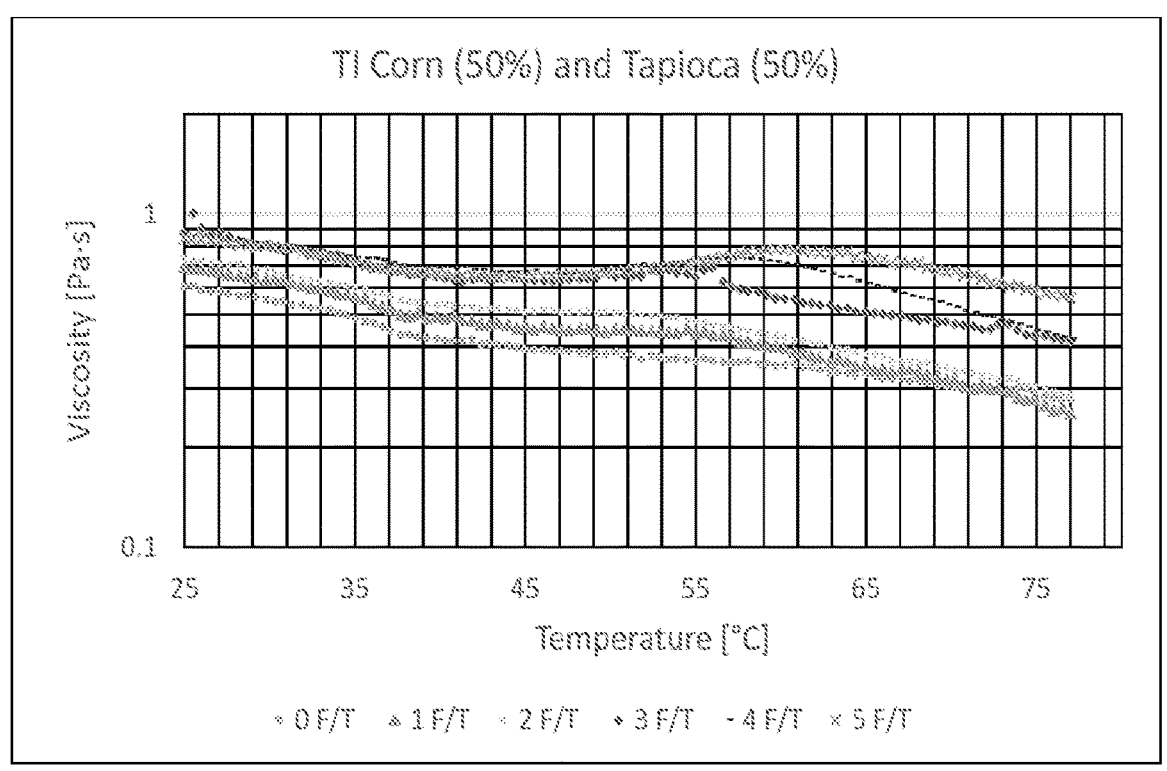

As shown in FIGS. 15 and 25, the shear rate and temperature sweeps for 100% TI corn starch exhibited a change around two freeze/thaw cycles that results in a change in viscosity. In contrast, the shear rate and temperature sweeps for the compositions of TI corn starch and waxy rice were similar to each other until the fourth or fifth freeze/thaw cycle. Thus, the soup samples containing the starch composition with waxy rice were able to withstand more freeze/thaw cycles before the change in viscosity occurred. This is an improvement compared to the soup samples containing TI corn starch only. Similarly, the shear rate and temperature sweeps for the compositions of TI corn starch and waxy corn were similar to each other and did not start to change until at least the third freeze/thaw cycle. As such, the soup samples containing the starch composition with waxy corn showed an improvement compared to the soup samples containing TI corn starch only. The results in FIGS. 16-21 and 26-31 illustrated that the point at which the viscosity changed was at a higher freeze/thaw cycle compared to FIGS. 15 and 25, indicating that the combination of TI corn starch and waxy corn or waxy rice may provide resiliency of the soup sample to withstand one or more freeze/thaw cycles.
Microscopy:

After each of the freeze/thaw cycles, the soup samples were looked at under a microscope to evaluate how the starch granules were holding up after undergoing one or more freeze/thaw cycles.

Figure 35:
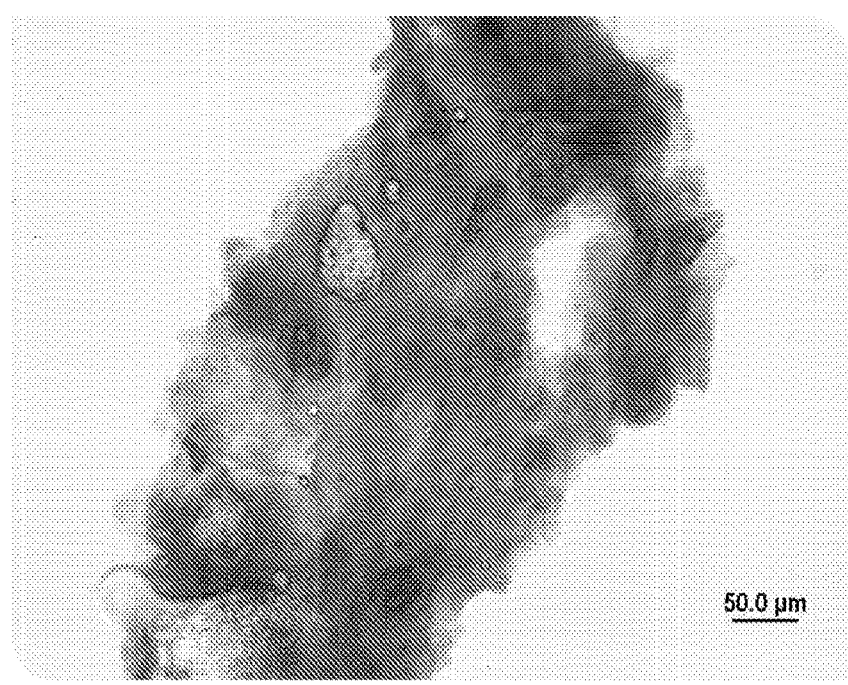
FIG. 35 is a microscopy image of the soup sample with 100% TI corn starch, after five freeze/thaw cycles.

FIG. 35 is a microscopy image of the soup sample having 100% TI corn starch, after undergoing 5 freeze/thaw cycles. FIG. 35 shows a large glob, indicative of a breakdown of the individual starch granules.

Figure 36:
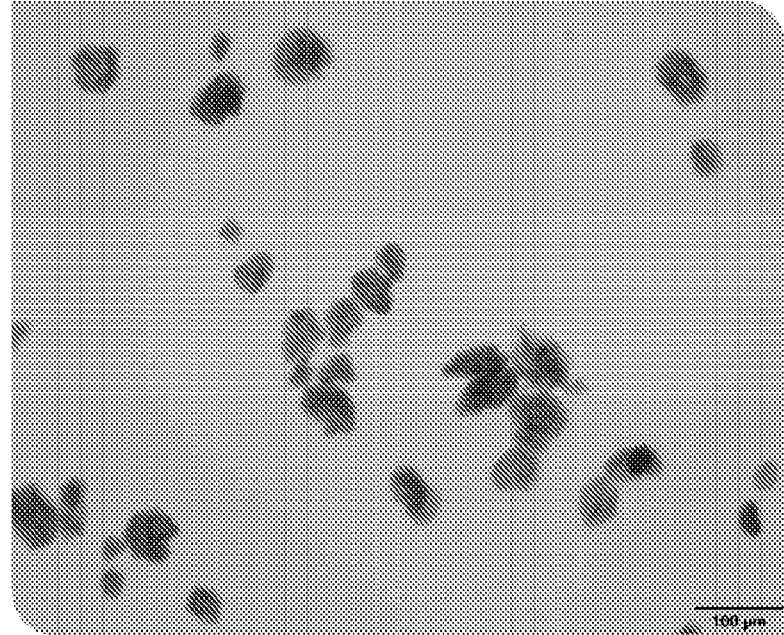
FIGS. 36-38 are microscopy images of the soup sample having compositions at various percentages of waxy rice (15%, 25% and 50%), after five freeze/thaw cycles.
Figure 37:
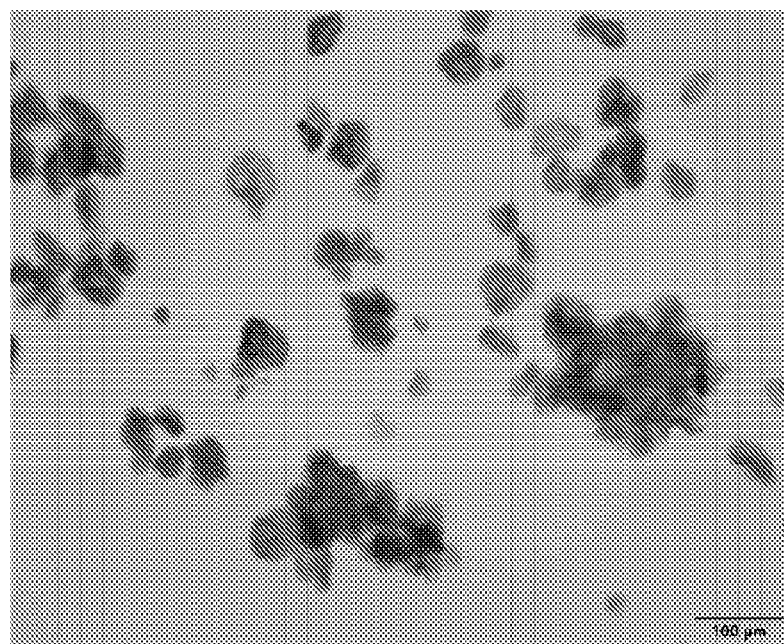
Figure 38:
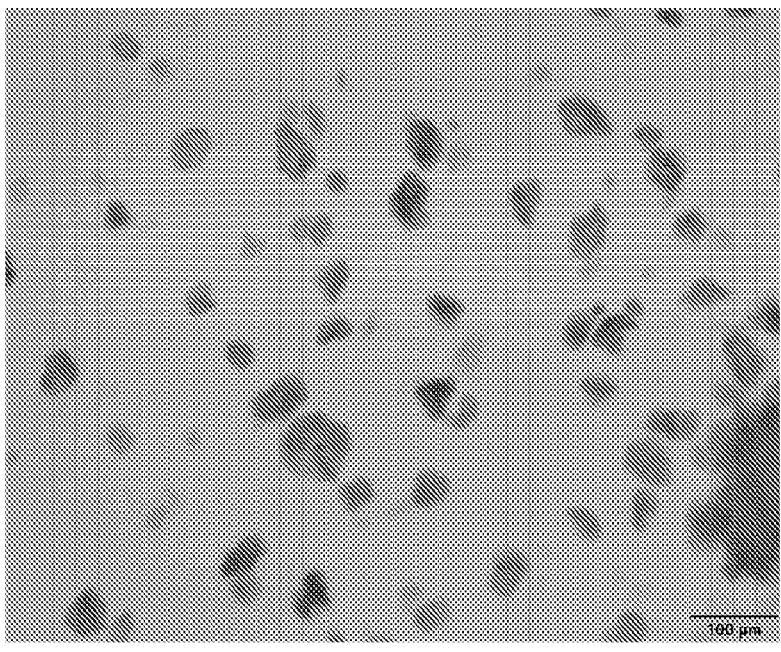

FIGS. 36-38 are microscopy images of soup samples having compositions at various percentages of waxy rice (15%, 25% and 50%), after undergoing 5 freeze/thaw cycles. FIG. 36 (starch composition with 15% waxy rice) shows that many of the individual starch granules are still intact, even though there may be some smaller clumps or globs present. FIGS. 37 and 38 (starch compositions with 25% and 50% waxy rice, respectively) show similar or slightly more clumping relative to FIG. 36, but nonetheless show an improvement in the stability of the starch, relative to FIG. 35 (100% TI corn starch).

Figure 39:
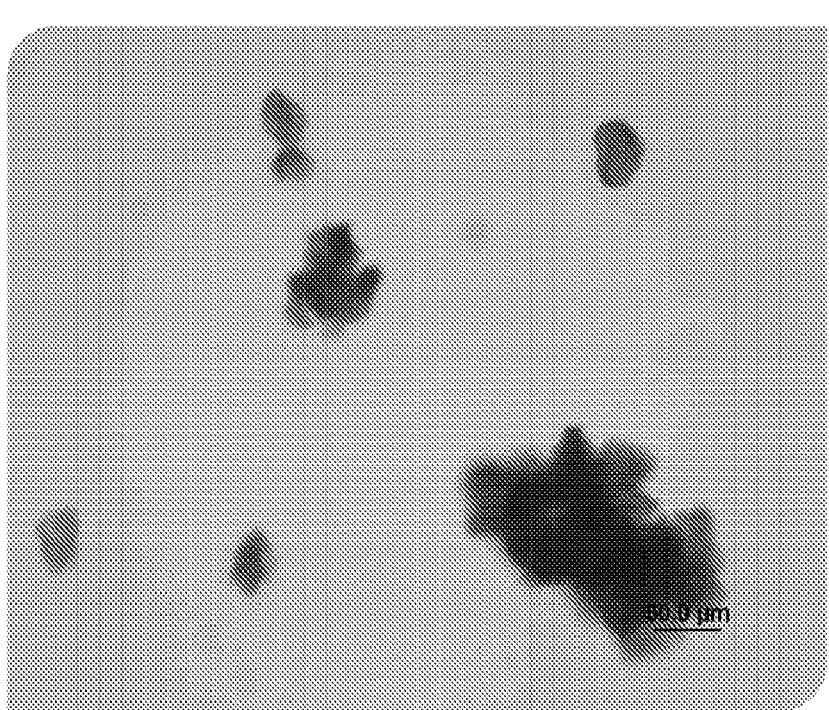
FIGS. 39-41 are microscopy images of the soup sample having compositions at various percentages of waxy corn (15%, 25% and 50%), after five freeze/thaw cycles.
Figure 40:
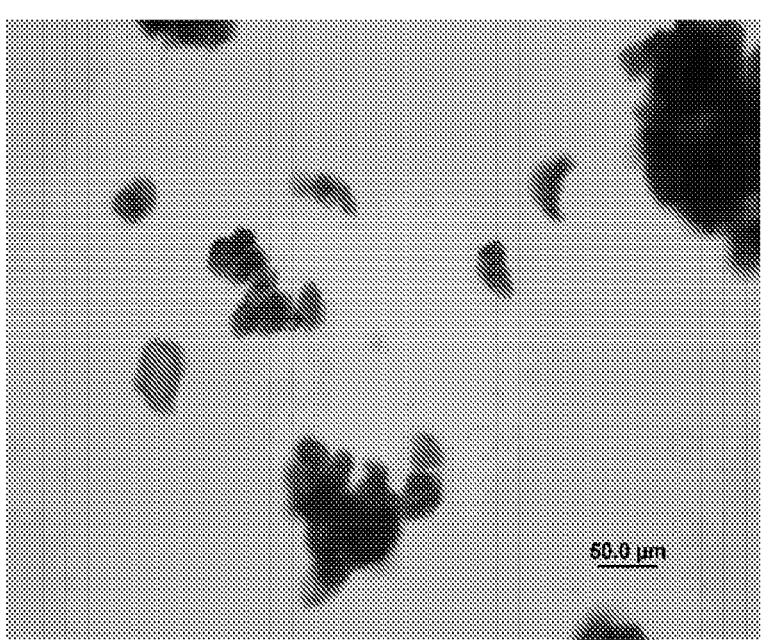
Figure 41:
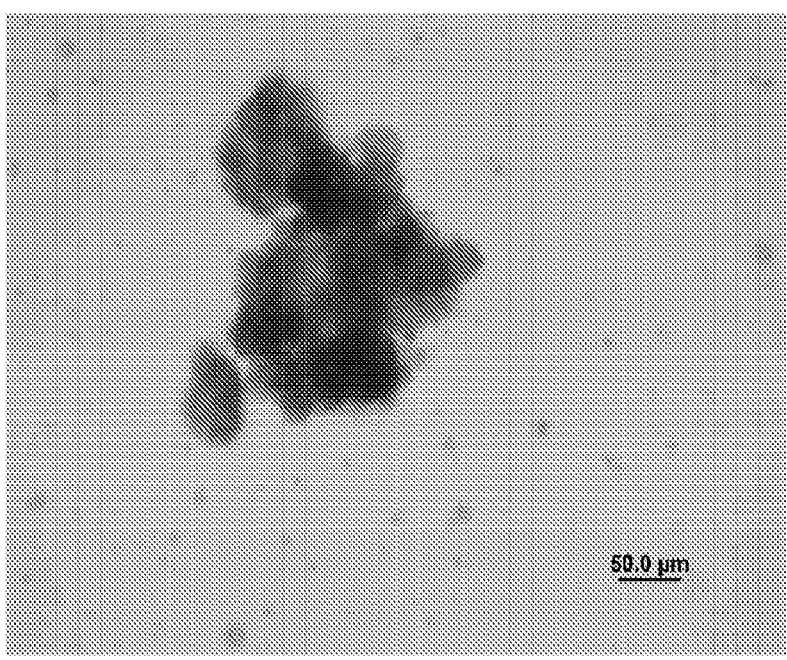

FIGS. 39-41 are microscopy images of soup samples having compositions at various percentages of waxy corn (15%, 25% and 50%), after undergoing 5 freeze/thaw cycles. FIGS. 39 and 40 (starch compositions with 15% and 25% waxy corn, respectively) showed some clumping, while still showing better stability as compared to FIG. 35 (100% TI corn starch). FIG. 41 (starch composition with 50% waxy corn) showed a large glob, indicating a breakdown of the starch.

Figure 42:
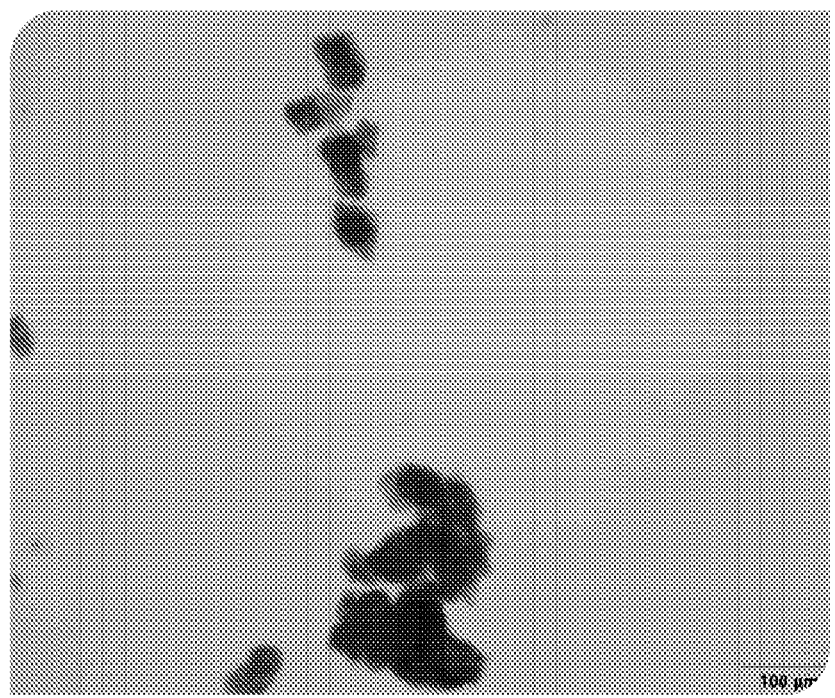
FIGS. 42-44 are microscopy images of the soup sample having compositions at various percentages of tapioca (15%, 25% and 50%), after five freeze/thaw cycles.
Figure 43:
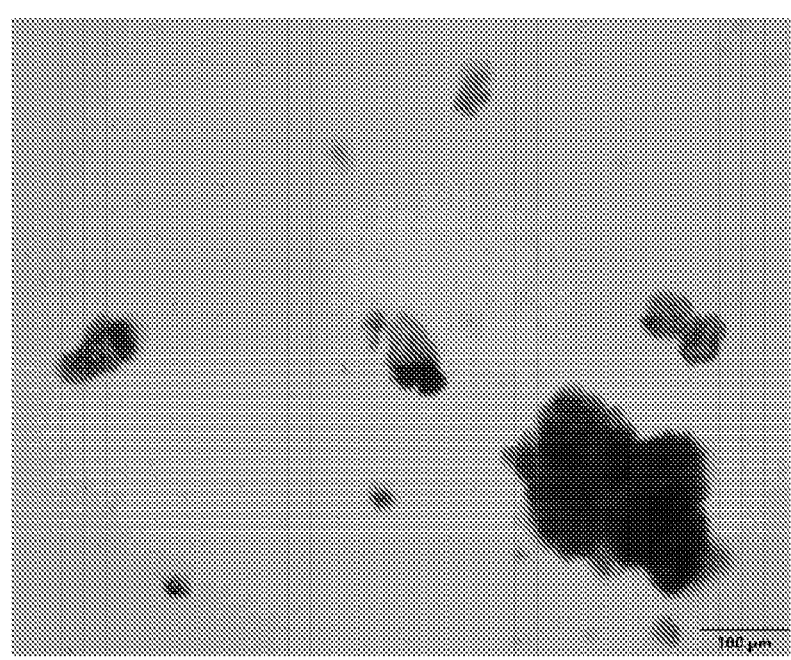
Figure 44:
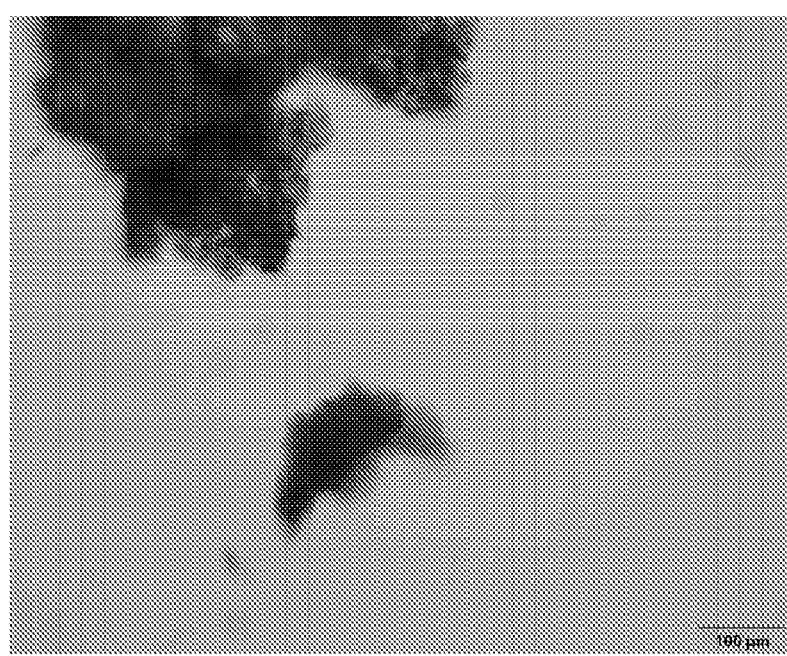

FIGS. 42-44 are microscopy images of soup samples having compositions at various percentages of tapioca (15%, 25% and 50%), after undergoing 5 freeze/thaw cycles. FIGS. 42 and 43 (starch composition with 15% and 25% tapioca, respectively) showed improved stability compared to 100% TI corn starch. However, the compositions with tapioca showed at least as much clumping, if not more clumping, compared to waxy corn at 15% and 25%. FIG. 44 (starch composition with 50% tapioca) showed significant clumping and an absence of any intact starch granules.

Of the microscopy images in FIGS. 35-44, the samples containing the composition with waxy rice, at percentages ranging between 15 and 50, showed the most stability of the starch molecules after 5 freeze/thaw cycles.

The samples tested in FIGS. 35-44 were also visually evaluated after each freeze/thaw cycle using a scale of 1 to 5. The rating scale was as follows: 1=smooth; 2=slightly lumpy; 3=lumpy; 4=chunky; and 5=very chunky. The results of the visual observations are shown in Table 5 below. The samples that showed intact starch granules under the microscope were observed as being smoother in texture compared to the samples that showed significant globs in the microscopy images.

13

TABLE 5

| Visual rating of soup samples as a function of freeze/thaw cycle | | | | | | | |
| --- | --- | --- | --- | --- | --- | --- | --- |
| | | Number of Freeze Thaw Cycles | | | | | |
| Sample | Starch Formulation | 0 | 1 | 2 | 3 | 4 | 5 |
| 1 | TI Corn (100%) | 1 | 1 | 2 | 4 | 5 | 4 |
| 2 | TI Corn (85%) Waxy Rice (15%) | 1 | 1 | 1 | 1 | 1 | 1 |
| 3 | TI Corn (75%) Waxy Rice (25%) | 1 | 1 | 1 | 1 | 1 | 1 |
| 4 | TI Corn (50%) Waxy Rice (50%) | 1 | 1 | 1 | 1 | 1 | 1 |
| 5 | TI Corn (85%) Waxy Corn (15%) | 1 | 1 | 1 | 1 | 1 | 2 |
| 6 | TI Corn (75%) Waxy Corn (25%) | 1 | 1 | 1 | 1 | 1 | 1 |
| 7 | TI Corn (50%) Waxy Corn (50%) | 1 | 1 | 1 | 2 | 2 | 3 |
| 8 | TI Corn (85%) Tapioca (15%) | 1 | 1 | 1 | 1 | 2 | 3 |
| 9 | TI Corn (75%) Tapioca (25%) | 1 | 1 | 1 | 2 | 2 | 3 |
| 10 | TI Corn (50%) Tapioca (50%) | 1 | 1 | 1 | 3 | 3 | 4 |

As shown in Table 5, the soup sample having 100% TI corn starch showed an increase on the point scale (i.e. decrease in texture quality) as the number of freeze/thaw cycles increased. In contrast, the soup samples having a composition of TI corn starch and waxy rice had a constant rating of 1 at all tested levels (15%, 25% and 50% waxy rice) across all freeze/thaw cycles. The soup samples having a composition of TI corn starch and waxy corn at 15% and 25% had a rating of 1 until five freeze/thaw cycles. The soup sample having a starch composition with 50% waxy corn had a rating of 2 or more after three freeze/thaw cycles. Although the soup samples having a composition of TI corn starch and tapioca showed a visual improvement relative to the samples having 100% TI corn starch, the samples with tapioca exhibited lower texture quality relative to the samples with waxy corn and waxy rice.

The food products in the above Examples are provided to demonstrate the viability of the starch composition for use within a retorted food product, such as a soup. It is recognized that the starch compositions disclosed herein can be suitable for use in other food products, in addition to those specifically focused on herein.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls. In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A starch composition comprising:
a thermally inhibited (TI) corn starch in a first amount ranging between 50 and 85 weight percent of the starch composition; and
a waxy starch in a second amount ranging between 15 and 50 weight percent of the starch composition, wherein the waxy starch is waxy corn or waxy rice; wherein the composition has a hot paste viscosity at 120° C. of between 300 and 900 centipoise, wherein the waxy starch is a native starch, wherein the first amount is greater than the second amount, and wherein the starch composition provides texture, shelf stability and/or cold-storage stability in a food product.

2. The starch composition of claim 1 wherein the first amount is between 75 and 85 weight percent of the starch composition.

3. The starch composition of claim 1 wherein the second amount is between 15 and 25 weight percent of the starch composition.

4. A food product comprising the starch composition of claim 1, wherein the starch composition is equal to or less than about 5 weight percent of the food product.

5. A method of making a starch composition of claim 1, the method comprising:
producing a thermally inhibited (TI) corn starch;
producing a waxy starch; and
blending the TI corn starch and the waxy starch to form a starch composition, wherein the starch composition comprises TI corn starch in a first amount ranging between 50 and 85 weight percent of the starch composition, wherein the waxy starch in a second amount ranges between 15 and 50 weight percent of the starch composition, and the waxy starch is waxy corn or waxy rice wherein the composition has a hot paste viscosity at 120° C. of between 300 and 900 centipoise, wherein the waxy starch is a native starch, wherein the first amount is greater than the second amount, and wherein the starch composition provides texture, shelf stability and/or cold-storage stability in a food product.

6. The method of claim 5 wherein the waxy starch ranges between 15 and 25 weight percent of the starch composition.

7. The method of claim 5 wherein the TI corn starch ranges between 75 and 85 weight percent of the starch composition.

8. A method of using a starch composition of claim 1 in a food product, the method comprising:

producing a starch composition comprising a thermally inhibited (TI) waxy corn starch in a first amount ranging between 50 and 85 weight percent of the starch composition and a native waxy starch in a second amount between 15 and 50 weight percent of the starch composition, wherein the composition has a hot paste viscosity at 120° C. of between 300 and 900 centipoise, wherein the first amount is greater than the second amount, and wherein the starch composition provides texture, shelf stability and/or cold-storage stability in a food product and wherein the native waxy starch is native waxy corn or native waxy rice;

combining the starch composition with one or more additional food ingredients to form the food product; and thermally processing the food product to form a sterilized food product, the sterilized food product suitable for storage at room temperature prior to consumption by a consumer at a future date.

9. The method of claim 8 wherein the food product is a soup.

10. The method of claim 8 wherein the native waxy starch is native waxy corn and the amount ranges between 15 and 25 weight percent of the starch composition.

11. The method of claim 8 wherein the native waxy starch is native waxy rice and the amount ranges between 15 and 25 weight percent of the starch composition.

12. The method of claim 8 wherein the TI waxy corn starch is low amylose corn starch.

13. The method of claim 8 wherein thermally processing the food product comprises at least one of retort, ultrahigh temperature (UHT) treatment, or aseptic packaging.

14. The method of claim 8 wherein a post retort viscosity of the food product at 70° F. is greater than 500 centipoise.

15. The starch composition of claim 1 wherein the first amount is between 75 and 85 weight percent of the starch composition and wherein the second amount is between 15 and 25 weight percent of the starch composition.

16. The starch composition of claim 1, wherein the TI corn starch is a TI waxy corn starch.

17. The starch composition of claim 15, wherein the TI corn starch is a TI waxy corn starch, wherein the waxy starch is native waxy rice.

* * * * *